United States Patent
Drahm et al.

(10) Patent No.: US 9,109,936 B2
(45) Date of Patent: Aug. 18, 2015

(54) MEASURING DEVICE ELECTRONICS FOR A MEASURING DEVICE AS WELL AS MEASURING DEVICE FORMED THEREWITH

(75) Inventors: Wolfgang Drahm, Erding (DE); Gernot Engstler, Riehen (CH); Hans Pohl, Müllheim (DE); Christian Matt, Aesch (CH); Robert Lalla, Lörrach (DE); Matthias Brudermann, Moehlin (CH)

(73) Assignee: ENDRESS + HAUSER FLOWTEC AG, Reinach (CH)

( * ) Notice: Subject to any disclaimer, the term of this patent is extended or adjusted under 35 U.S.C. 154(b) by 516 days.

(21) Appl. No.: 13/484,444

(22) Filed: May 31, 2012

(65) Prior Publication Data

US 2012/0310545 A1 Dec. 6, 2012

Related U.S. Application Data

(60) Provisional application No. 61/491,420, filed on May 31, 2011.

(30) Foreign Application Priority Data

May 31, 2011 (DE) .................. 10 2011 076 838

(51) Int. Cl.
*G06F 1/26* (2006.01)
*G01F 1/84* (2006.01)
*G06F 11/16* (2006.01)

(52) U.S. Cl.
CPC ............ *G01F 1/8431* (2013.01); *G01F 1/8436* (2013.01); *G01F 1/8477* (2013.01); *G06F 11/1604* (2013.01); *G06F 11/1608* (2013.01)

(58) Field of Classification Search
CPC ... G01F 1/8431; G01F 1/8477; G01F 1/8436; G01F 11/1608; G01F 11/1604

USPC ............. 702/22, 176, 89; 375/354, 355, 373, 375/374, 375, 376; 331/16, 17, 176, 1 A
See application file for complete search history.

(56) References Cited

U.S. PATENT DOCUMENTS

| | | | |
|---|---|---|---|
| 3,878,725 A | 4/1975 | Gaertner | |
| 4,156,200 A | 5/1979 | Gomez | |
| 4,254,492 A | 3/1981 | McDermott, III | |

(Continued)

FOREIGN PATENT DOCUMENTS

| | | |
|---|---|---|
| DE | 3711754 A1 | 10/1988 |
| DE | 3934007 A1 | 10/1990 |

(Continued)

OTHER PUBLICATIONS

English translation of the IPR on Patentability, WIPO, Geneva, Dec. 12, 2013.
German Srch Rpt, Nov. 2, 2011, German Patent Office, Munich.
Intl Srch Rpt, Jul. 24, 2012, The Netherlands.

*Primary Examiner* — Carol S Tsai
(74) *Attorney, Agent, or Firm* — Bacon & Thomas, PLLC

(57) ABSTRACT

A measuring device electronics comprises a processor and two clock signal generators. One clock signal generator serves for producing a working clock signal, and also for producing a reference clock signal which is dependant on the working clock signal. The other clock signal generator, serves for producing a second reference clock signal, which is independent of the working clock signal. Based on the two independent reference clock signals, a frequency difference, can, to the extent that such is present, be ascertained during operation of the measuring device electronics or of the measuring device formed therewith. The frequency difference, represents a difference between the instantaneous clocking frequency of the first reference clock signal and the instantaneous clocking frequency of the second reference clock signal, and, in this respect, represents a measure for a deviation of an instantaneous clocking frequency, from the nominally predetermined clocking frequency, of the working clock signal.

45 Claims, 5 Drawing Sheets

(56) References Cited

U.S. PATENT DOCUMENTS

| | | |
|---|---|---|
| 4,308,754 A | 1/1982 | Pedersen et al. |
| 4,317,116 A | 2/1982 | Macho |
| 4,468,971 A | 9/1984 | Herzl et al. |
| 4,524,610 A | 6/1985 | Fitzgerald et al. |
| 4,574,328 A | 3/1986 | Maier |
| 4,594,584 A | 6/1986 | Pfeiffer et al. |
| 4,617,607 A | 10/1986 | Park et al. |
| 4,656,353 A | 4/1987 | Thompson |
| 4,716,770 A | 1/1988 | Herzog |
| 4,768,384 A | 9/1988 | Flecken et al. |
| 4,777,833 A | 10/1988 | Carpenter |
| 4,801,897 A | 1/1989 | Flecken |
| 4,850,213 A | 7/1989 | Steinebrunner et al. |
| 4,879,911 A | 11/1989 | Zolock |
| 4,926,340 A | 5/1990 | Goetzinger et al. |
| 5,009,109 A | 4/1991 | Kalotay et al. |
| 5,024,104 A | 6/1991 | Dames |
| 5,050,439 A | 9/1991 | Thompson |
| 5,052,230 A | 10/1991 | Lang et al. |
| 5,065,152 A | 11/1991 | Williams |
| 5,068,592 A | 11/1991 | Leonard et al. |
| 5,115,209 A * | 5/1992 | Grace et al. .................. 331/49 |
| 5,131,279 A | 7/1992 | Lang et al. |
| 5,207,101 A | 5/1993 | Haynes |
| 5,231,884 A | 8/1993 | Zolock |
| 5,359,881 A | 11/1994 | Kalotay et al. |
| 5,363,341 A | 11/1994 | Schwald et al. |
| 5,416,723 A | 5/1995 | Zyl |
| 5,469,748 A | 11/1995 | Kalotay |
| 5,535,243 A | 7/1996 | Voegele et al. |
| 5,576,500 A | 11/1996 | Cage et al. |
| 5,602,345 A | 2/1997 | Wenger et al. |
| 5,604,685 A | 2/1997 | Seesink et al. |
| 5,672,975 A | 9/1997 | Kielb et al. |
| 5,687,100 A | 11/1997 | Buttler et al. |
| 5,706,007 A | 1/1998 | Fragnito et al. |
| 5,731,527 A | 3/1998 | Van Cleve |
| 5,742,225 A | 4/1998 | Wetzel et al. |
| 5,774,702 A * | 6/1998 | Mitsuishi et al. ............. 713/501 |
| 5,796,011 A | 8/1998 | Keita et al. |
| 5,804,741 A | 9/1998 | Freeman |
| 5,869,770 A | 2/1999 | Yoshimura et al. |
| 5,959,372 A | 9/1999 | Every |
| 5,969,558 A * | 10/1999 | Abe ............... 327/292 |
| 6,006,609 A | 12/1999 | Drahm et al. |
| 6,014,100 A | 1/2000 | Fehrenbach et al. |
| 6,051,783 A | 4/2000 | Dreyer et al. |
| 6,073,495 A | 6/2000 | Stadler |
| 6,131,073 A * | 10/2000 | Honda et al. .................. 702/107 |
| 6,140,940 A | 10/2000 | Klofer et al. |
| 6,236,322 B1 | 5/2001 | Lopatin et al. |
| 6,252,826 B1 | 6/2001 | Kaizu |
| 6,269,701 B1 | 8/2001 | Keech |
| 6,285,094 B1 | 9/2001 | Fest, Sr. |
| 6,311,136 B1 | 10/2001 | Henry et al. |
| 6,352,000 B1 | 3/2002 | Getman et al. |
| 6,366,436 B1 | 4/2002 | Maier et al. |
| 6,397,683 B1 | 6/2002 | Hagenmeyer et al. |
| 6,476,522 B1 | 11/2002 | Hays et al. |
| 6,480,131 B1 | 11/2002 | Roper et al. |
| 6,487,507 B1 | 11/2002 | Mansfield et al. |
| 6,512,358 B2 | 1/2003 | Klofer et al. |
| 6,513,393 B1 | 2/2003 | Eckert et al. |
| 6,535,161 B1 | 3/2003 | McEwan |
| 6,539,819 B1 | 4/2003 | Dreyer et al. |
| 6,556,447 B2 | 4/2003 | Cudini et al. |
| 6,574,515 B1 | 6/2003 | Kirkpatrick et al. |
| 6,577,989 B2 | 6/2003 | Florin |
| 6,640,308 B1 | 10/2003 | Keyghobad et al. |
| 6,651,513 B2 | 11/2003 | Wenger et al. |
| 6,662,120 B2 | 12/2003 | Drahm et al. |
| 6,666,098 B2 | 12/2003 | Drahm et al. |
| 6,769,301 B2 | 8/2004 | Barger et al. |
| 6,776,053 B2 | 8/2004 | Schlosser et al. |
| 6,792,060 B1 * | 9/2004 | Dujardin et al. ............. 375/355 |
| 6,799,476 B2 | 10/2004 | Brockhaus |
| 6,840,109 B2 | 1/2005 | Drahm et al. |
| 6,854,055 B1 | 2/2005 | Stinus et al. |
| 6,910,366 B2 | 6/2005 | Drahm et al. |
| 6,920,798 B2 | 7/2005 | Wenger et al. |
| 7,017,424 B2 | 3/2006 | Rieder et al. |
| 7,032,045 B2 | 4/2006 | Kostadinov |
| 7,073,396 B2 | 7/2006 | Hussain et al. |
| 7,075,313 B2 | 7/2006 | Wolter |
| 7,133,727 B2 | 11/2006 | Van Dyk et al. |
| 7,134,348 B2 | 11/2006 | Kolahi et al. |
| 7,200,503 B2 | 4/2007 | Lalla |
| 7,284,449 B2 | 10/2007 | Rieder et al. |
| 7,360,451 B2 | 4/2008 | Bitto et al. |
| 7,412,322 B1 * | 8/2008 | Rask et al. .................... 701/104 |
| 7,460,057 B2 | 12/2008 | Fehrenbach |
| 7,508,274 B2 * | 3/2009 | Keating ...................... 331/16 |
| 2004/0117675 A1 | 6/2004 | Brockhaus |
| 2004/0221187 A1 * | 11/2004 | Durand et al. ................ 713/300 |
| 2005/0139015 A1 | 6/2005 | Gebhardt et al. |
| 2006/0096390 A1 | 5/2006 | Kolahi et al. |
| 2006/0112774 A1 | 6/2006 | Kolahi et al. |
| 2006/0120054 A1 | 6/2006 | Buschke |
| 2006/0161359 A1 | 7/2006 | Lalla |
| 2006/0179956 A1 | 8/2006 | Kourosh |
| 2007/0217091 A1 | 9/2007 | Florin et al. |
| 2009/0000392 A1 | 1/2009 | Zhou et al. |
| 2009/0038406 A1 | 2/2009 | Hocker |
| 2009/0178937 A1 | 7/2009 | Taylor |
| 2009/0277281 A1 | 11/2009 | Henry et al. |
| 2010/0095784 A1 | 4/2010 | Kuttler et al. |
| 2010/0236338 A1 | 9/2010 | Bitto et al. |
| 2010/0242623 A1 | 9/2010 | Bitto et al. |
| 2010/0242624 A1 | 9/2010 | Bitto et al. |
| 2010/0255796 A1 | 10/2010 | Koukol, Jr. |
| 2012/0056628 A1 | 3/2012 | Michalski |

FOREIGN PATENT DOCUMENTS

| | | |
|---|---|---|
| DE | 4412388 A1 | 12/1995 |
| DE | 10041166 A1 | 3/2002 |
| DE | 102005032808 A1 | 1/2007 |
| DE | 102005044724 A1 | 3/2007 |
| DE | 102005049500 A1 | 5/2007 |
| DE | 102005057094 A1 | 6/2007 |
| DE | 102008014347 A1 | 1/2009 |
| EP | 525920 A1 | 2/1993 |
| EP | 591926 A2 | 4/1994 |
| EP | 866318 A1 | 9/1998 |
| EP | 903651 A1 | 3/1999 |
| EP | 926473 A2 | 6/1999 |
| EP | 984248 A1 | 3/2000 |
| EP | 1008836 A1 | 6/2000 |
| EP | 1058093 A1 | 12/2000 |
| EP | 1147463 | 10/2001 |
| EP | 1158289 A1 | 11/2001 |
| EP | 1197732 A1 | 4/2002 |
| EP | 1669726 A1 | 6/2006 |
| EP | 2199762 A1 | 6/2010 |
| WO | 88/02476 A1 | 4/1988 |
| WO | 88/02853 A1 | 4/1988 |
| WO | 95/16897 A2 | 6/1995 |
| WO | 00/14485 A1 | 3/2000 |
| WO | 00/26739 A1 | 5/2000 |
| WO | 00/36379 A1 | 6/2000 |
| WO | 00/48157 A1 | 8/2000 |
| WO | 01/02816 A2 | 1/2001 |
| WO | 02/45045 A1 | 6/2002 |
| WO | 02/086426 A1 | 10/2002 |
| WO | 02/103327 A1 | 12/2002 |
| WO | 03/048874 A2 | 6/2003 |
| WO | 2005013506 A1 | 2/2005 |
| WO | 2006/073388 A1 | 7/2006 |
| WO | 2007042367 A1 | 4/2007 |
| WO | 2008/003627 A1 | 1/2008 |
| WO | 2009010321 A1 | 1/2009 |
| WO | 2011/011255 A2 | 1/2011 |

* cited by examiner

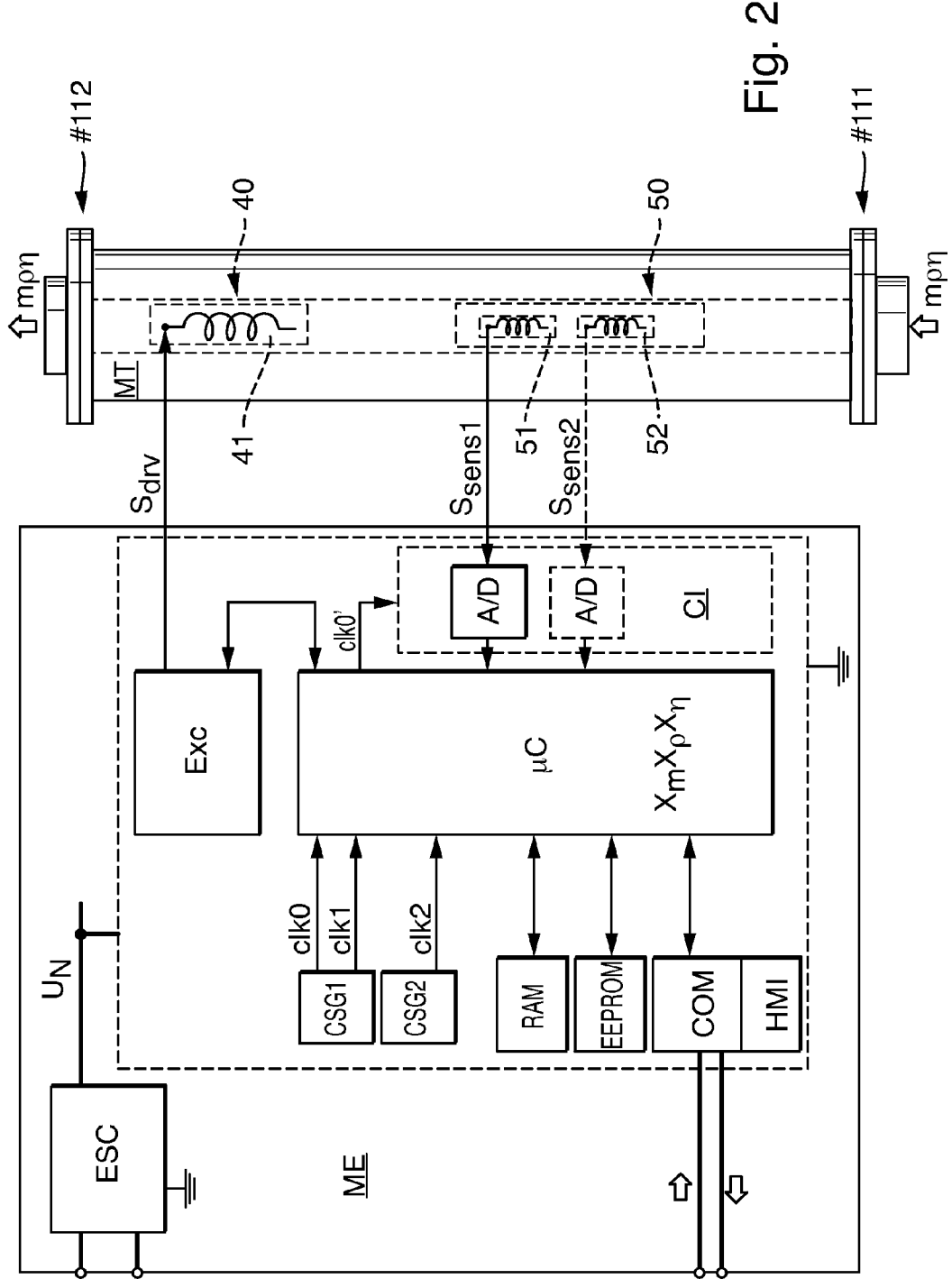

MEASURING DEVICE ELECTRONICS FOR A MEASURING DEVICE AS WELL AS MEASURING DEVICE FORMED THEREWITH

CROSS-REFERENCE TO RELATED APPLICATION

This application is a nonprovisional which claims the benefit of U.S. Provisional Application No. 61/491,420, filed on May 31, 2011.

TECHNICAL FIELD

The invention relates to a measuring device electronics for a measuring device (especially a measuring device embodied as a measuring and/or switching device of industrial measurements and automation technology and/or an electronic measuring device) as well as to such a measuring device. Moreover, the invention relates to a method for verifying such a measuring device.

BACKGROUND DISCUSSIONS

In industrial process measurements technology, especially also in connection with the automation of chemical processes or procedures for producing a product from a raw or starting material by the use of chemical, physical or biological processes and/or the automated control of industrial plants, electrical measuring devices installed near to the process, so called field devices, are applied, such as, for example, Coriolis mass flow measuring devices, density measuring devices, magneto-inductive flow measuring devices, vortex flow measuring devices, ultrasonic flow measuring devices, thermal, mass flow measuring devices, pressure measuring devices, fill level measuring devices, etc., which serve for producing measured values representing process variables, as well as measured value signals—in given cases also digital measured value signals—ultimately representing these measured values. The process variables in each case to be registered can be, depending on application, for example, mass flow, density, viscosity, fill level, limit level or the like, of a liquid, a powdered medium, a vaporous medium or a gaseous medium, which is conveyed or held in a corresponding container, e.g. a pipeline or a tank.

For registering the respective process variables, measuring devices of the aforementioned type contain, in each case, a corresponding physical to electrical, or chemical to electrical, measuring transducer. Such is most often inserted in a wall of the respective container containing the medium or into the course of a respective line—for example a pipeline—conveying the medium, and serves to produce at least one corresponding electrical measurement signal corresponding to the process variable to be registered. For processing the measurement signal, the measuring transducer is further connected with a measuring device internal, operating and evaluating circuit, which is provided in a measuring device electronics of the measuring device, and which serves for further processing or evaluation of the at least one measurement signal, as well as also for generating corresponding measured value signals. The latter, in the case of modern measuring devices of the type being discussed, is most often formed by means of a processor, such as, for instance, a microprocessor and/or a digital signal processor (DSP), clocked by a corresponding clock signal. Examples of such measuring devices or measuring transducers, and especially also details concerning their application and operation, are described in, among others, DE 100 41 166, DE-A 10 2005 032808, the DE-A 37 11 754n, DE-A 39 34 007, DE-A 44 12 388, EP-A 1 058 093, EP-A 1 147 463, EP-A 1 158 289, EP-A 1 197 732, EP-A 1 669 726, EP-A 525 920, EP-A 591 926, EP-A 866 318, EP-A 926 473, EP-A 984 248, US-A 2004/0117675, US-A 2005/0139015, US-A 2006/0096390, US-A 2006/0112774, US-A 2006/0120054, US-A 2006/0161359, US-A 2006/0179956, US-A 2007/0217091, US-A 2009/0000392, US-A 2009/0038406, US-A 2009/0277281, US-A 2010/0095784, US-A 2010/0236338, US-A 2010/0242623, US-A 2010/0242624, US-A 2010/0255796, U.S. Pat. No. 3,878,725, U.S. Pat. No. 4,308,754, U.S. Pat. No. 4,317,116, U.S. Pat. No. 4,468,971, U.S. Pat. No. 4,524,610, U.S. Pat. No. 4,574,328, U.S. Pat. No. 4,594,584, U.S. Pat. No. 4,617,607, U.S. Pat. No. 4,656,353, U.S. Pat. No. 4,716,770, U.S. Pat. No. 4,768,384, U.S. Pat. No. 4,777,833, U.S. Pat. No. 4,801,897, U.S. Pat. No. 4,850,213, U.S. Pat. No. 4,879,911, U.S. Pat. No. 4,926,340, U.S. Pat. No. 5,009,109, U.S. Pat. No. 5,024,104, U.S. Pat. No. 5,050,439, U.S. Pat. No. 5,052,230, U.S. Pat. No. 5,065,152, U.S. Pat. No. 5,068,592, U.S. Pat. No. 5,131,279, U.S. Pat. No. 5,207,101, U.S. Pat. No. 5,231,884, U.S. Pat. No. 5,359,881, U.S. Pat. No. 5,363,341, U.S. Pat. No. 5,416,723, U.S. Pat. No. 5,469,748, U.S. Pat. No. 5,535,243, U.S. Pat. No. 5,602,345, U.S. Pat. No. 5,604,685, U.S. Pat. No. 5,672,975, U.S. Pat. No. 5,687,100, U.S. Pat. No. 5,706,007, U.S. Pat. No. 5,731,527, U.S. Pat. No. 5,742,225, U.S. Pat. No. 5,742,225, U.S. Pat. No. 5,796,011, U.S. Pat. No. 5,804,741, U.S. Pat. No. 5,869,770, U.S. Pat. No. 5,959,372, U.S. Pat. No. 6,006,609, U.S. Pat. No. 6,014,100, U.S. Pat. No. 6,051,783, U.S. Pat. No. 6,073,495, U.S. Pat. No. 6,140,940, U.S. Pat. No. 6,236,322, U.S. Pat. No. 6,269,701, U.S. Pat. No. 6,285,094, U.S. Pat. No. 6,311,136, U.S. Pat. No. 6,352,000, U.S. Pat. No. 6,366,436, U.S. Pat. No. 6,397,683, U.S. Pat. No. 6,476,522, U.S. Pat. No. 6,480,131, U.S. Pat. No. 6,487,507, U.S. Pat. No. 6,512,358, U.S. Pat. No. 6,513,393, U.S. Pat. No. 6,535,161, U.S. Pat. No. 6,539,819, U.S. Pat. No. 6,556,447, U.S. Pat. No. 6,574,515, U.S. Pat. No. 6,577,989, U.S. Pat. No. 6,640,308, U.S. Pat. No. 6,662,120, U.S. Pat. No. 6,666,098, U.S. Pat. No. 6,769,301, U.S. Pat. No. 6,776,053, U.S. Pat. No. 6,799,476, U.S. Pat. No. 6,840,109, U.S. Pat. No. 6,854,055, U.S. Pat. No. 6,920,798, U.S. Pat. No. 7,017,424, U.S. Pat. No. 7,032,045, U.S. Pat. No. 7,073,396, U.S. Pat. No. 7,075,313, U.S. Pat. No. 7,133,727, U.S. Pat. No. 7,134,348, U.S. Pat. No. 7,200,503, U.S. Pat. No. 7,360,451, WO-A 00/14 485, WO-A 00/36 379, WO-A 00/48157, WO-A 01/02816, WO-A 02/086426, WO-A 02/103327, WO-A 02/45045, WO-A 03/048874, WO-A 2006/073388, WO-A 2008/003627, WO-A 2011/011255, WO-A 88/02 476, WO-A 88/02 853, or WO-A 95/16 897.

In the case of a large number of measuring devices of the type being discussed, for producing the measurement signal, the measuring transducer is driven during operation by a driver signal generated, at least at times, by the operating and evaluating circuit in such a manner that it acts, at least indirectly, or via a probe directly contacting the medium, practically directly, on the medium in a manner suitable for the measuring, on the medium, in order to bring about corresponding reactions there corresponding with the measured variable to be registered. The driver signal can, in such case, be correspondingly controlled as regards, for example, an electrical current level, a voltage level and/or a frequency. To be cited as examples for such active measuring transducers, that is measuring transducers correspondingly converting an electrical driver signal in the medium, are especially flow measuring transducers serving for measuring media at least at times flowing, e.g. measuring transducers with at least one coil operated by the driver signal and producing a magnetic field, or at least one ultrasonic transmitter driven by the driver signal, or also fill level and/or limit level transducers serving for measuring and/or monitoring fill levels in a container, such as, for example, measuring transducers with freely radiating microwave antennas, with Goubau lines or with vibrating immersion elements.

Devices of the type being discussed have, furthermore, at least one housing with at least one, usually pressure-tightly and/or explosion resistantly closed chamber accommodating electrical, electronic and/or electro-mechanical components and/or assemblies of the device, for example, components of the mentioned operating and evaluating circuit. Thus, for accommodating the measuring device electronics, measuring devices of the described type most often comprise a comparatively robust, especially impact-resistant, pressure-resistant, and/or weather-resistant electronics housing. This can be arranged—as, for example, provided in U.S. Pat. No. 6,397,683 or WO-A 00/36379—removed from the measuring device and connected with this only via a flexible line; it can, however—as is shown, for example, in EP-A 903 651 or EP-A 1 008 836—also be arranged directly on the measuring transducer or on a transducer measuring transducer housing separately housing the measuring transducer. In given cases, the electronics housing can then, as is, for example, shown in EP-A 984 248, U.S. Pat. No. 4,594,584, U.S. Pat. No. 4,716,770 or U.S. Pat. No. 6,352,000, also serve to accommodate some mechanical components of the measuring transducer, such as, for example, membrane, rod, sleeve or tubular deformation or vibrating elements operationally deforming under mechanical action; compare for this also the previously mentioned U.S. Pat. No. 6,352,000 or U.S. Pat. No. 6,051,783.

In the case of measuring devices, the respective measuring device electronics is usually electrically connected via corresponding electrical lines to a superordinated electronic data processing system arranged most often spatially removed from the respective device and most often also spatially distributed, wherein measured values produced by the respective measuring device are promptly forwarded to this data processing system by means of a measured value signal correspondingly carrying these measured values. Electrical devices of the described type are additionally usually connected by means of a data transmission network provided within the superordinated data processing system with one another and/or with corresponding electronic process controllers, for example, programmable logic controllers, installed on-site or process control computers installed in a remote control room, to which the measured values produced by means of the measuring device and digitized and correspondingly suitably encoded are forwarded. By means of such process control computers, the transmitted measured values can be further processed and visualized as corresponding measurement results, e.g. on monitors, and/or be converted into control signals for other field devices embodied as actuating devices, e.g. magnetic valves, electric motors etc. Since modern measuring arrangements most often can also be directly monitored and, in given cases, controlled and/or can be configured by such control computers, associated operating data are in a corresponding manner likewise sent to the measuring device via the aforementioned transmission networks, which are most often data transmission networks that are hybrid as regards the transmission physics and/or the transmission logic. Accordingly, the data processing system usually also serves to condition—for example, to suitably digitize—the measured value signal delivered by the measuring device corresponding to the requirements of downstream data transmission networks, and, in given cases, to convert the signal into a corresponding telegram, and/or to evaluate it on-site. For such purpose, in such data processing systems, evaluating circuits electrically coupled with the respective connecting lines are provided, which pre-process and/or further process as well as, if required, suitably convert the measured values received from the respective measuring and/or switching device. Serving at least sectionally for data transmission in such industrial data processing systems are fieldbusses, especially serial fieldbusses, such as, for example, FOUNDATION FIELDBUS, RACKBUS-RS 485, PROFIBUS, etc., or, for example, also networks based on the ETHERNET standard, as well as the corresponding, most often comprehensively standardized, transmission protocols.

Besides the evaluating circuits required for processing and converting the measured values delivered by the respectively connected measuring devices, such superordinated data processing systems most often also have electrical supply circuits serving for supplying the connected measuring and/or switching devices with electrical energy. Thus, such electrical supply circuits provide corresponding supply voltages (in given cases fed directly by the connected fieldbus) for the respective measuring device electronics, and drive the electrical currents flowing through the electrical lines connected thereto as well as through the respective measuring device electronics. In such case, a supply circuit can be associated, for example, in each case, with exactly one measuring device, and, together with the evaluating circuit associated with the respective measuring device—for example, united to form a corresponding fieldbus adapter—be accommodated in a shared electronics housing, embodied, for example, as a hatrail module. It is, however, also quite usual to accommodate supply circuits and evaluating circuits in each case in separate electronics housings, in given cases spatially remote from one another, and correspondingly to wire these with one another via external lines.

As mentioned, among others, in the previously mentioned EP-A 1 197 732 or US-A 2009/0000392, measuring devices of the type being discussed, are at times to be tested—be it at the instigation of the user operating the measuring device and/or due to a requirement of one of the authorities overseeing the measuring point formed by means of the measuring device—as to whether the required accuracy of measurement or that stated in the specification is still reliably achieved, or whether the measuring device—for instance, as a result of wear of the measuring transducer and/or aging of the measuring device electronics—no longer measures sufficiently precisely or no longer in a sufficiently reproducible manner.

Such tests of the measuring device electronics in the context of a subsequent verification of its measuring functionality, or an equally subsequent validation of the measured values produced by means of the measuring device regularly occurs in the case of conventional measuring devices by a correspondingly certified external testing device being connected to the measuring device electronics via a service interface, wherein the external testing device serves to apply at least one defined test signal corresponding to the at least one measurement signal at the input of the measuring device electronics for the respective measurement signal of the measuring transducer. By means of the test signal, a particular behavior of the measuring transducer, and consequently a corresponding particular measured value for the measured variable otherwise to be registered can thus in each case be simulated. In association therewith, by means of the measuring device electronics, the test measured values corresponding with the respective test signal can thus be produced and compared with specifications for test measured values corresponding with the respective test signal. If the test measured values deviate by less than an allowable highest tolerance from the specifications, the measuring device electronics and consequently the measuring device has then passed these tests, and consequently, the measuring device electronics is correspondingly verified and permitted for further operation.

A disadvantage of such a method for testing measuring device electronics is particularly to be seen in the fact that, for its performance, normal measuring operation of the measuring device must be interrupted, and consequently the portion of the plant monitored from the measuring point must be taken out of operation for the duration of the test. Moreover, such testing requires a special, most often very expensive, testing device, which recurringly must undergo very complex recalibration. Furthermore, this kind of testing is regularly performed only by correspondingly trained and permitted examiners.

SUMMARY OF THE INVENTION

Taking the above into consideration, an object of the invention is to improve methods for testing measuring devices of the type being discussed, especially such generating measured values for chemical or physical measured variables based on a time (e.g. travel time) and/or frequency or phase angle measurement, respectively, to improve measuring device electronics of such measuring devices, with the goal that said testing of the measuring device electronics, particularly also in the context of a verification of the measuring functionality of the respective measuring device electronics and/or a validation of measured values produced therewith, can occur at least partially with "on-board" means of the measuring device, and, indeed, to the greatest extent possible also without interruption of the normal measurement operation.

For achieving the object, the invention resides in a measuring device electronics for a measuring device, wherein the measuring device electronics comprises: a processor, for example, one embodied as a microprocessor or as a digital signal processor; a first clock signal generator—for example, one formed by means of a quartz oscillator and/or by means of a PLL circuit and/or by means of an FLL circuit—for producing a working clock signal clocking the processor with a nominally constant clocking frequency and for producing a first reference clock signal dependant on the working clock signal and having a nominally constant clocking frequency, which is smaller than the clocking frequency of the working clock signal by a predetermined factor; as well as a second clock signal generator—for example, one formed by means of a quartz oscillator and/or formed by means of a PLL circuit and/or formed by means of an FLL circuit—for producing a second reference clock signal independent of the working clock signal and serving, for example, as a reference for the working clock signal and having a nominally constant clocking frequency, which is smaller than the clocking frequency of the working clock signal by a predetermined factor.

Furthermore, the invention resides in a measuring device for measuring at least one physical and/or chemical measured variable of a medium conveyed in a line—, for example, a pipeline or a flume—or in a container—for example, a tank or a vat—wherein this measuring device comprises such a measuring device electronics as well as a measuring transducer electrically coupled with said measuring device electronics, wherein this measuring transducer serves for transducing the at least one measured variable into at least one measurement signal dependent thereon. Moreover, the invention also resides in a method for testing such a measuring device—for example, for verifying the measuring functionality of its measuring device electronics and/or for validating measured values produced by means of the measuring device—wherein the method comprises steps as follows:

producing the working clock signal by means of the first clock signal generator and clocking the processor with the working clock signal;

producing the first reference clock signal by means of the first clock signal generator;

producing the second reference clock signal by means of the second clock signal generator;

producing, by means of the processor, the measured values representing the at least one measured variable, for example, based on the at least one measurement signal as well as based on the working clock signal as the time base and/or frequency base for the at least one measurement signal or the measured values;

ascertaining a frequency difference, which represents a difference between the instantaneous clocking frequency of the first reference clock signal and the instantaneous clocking frequency of the second reference clock signal; and generating an error report, which signals that at least one of the two clock signal generators is delivering a reference clock signal with an instantaneous clocking frequency, which deviates by a predetermined degree from a nominal clocking frequency respectively predetermined therefore, and/or which signals that measured values ascertained by means of the processor are erroneous or unreliable by more than a predetermined degree, if the instantaneous clock frequencies of the first and second reference clock signals deviate from one another by more than a predetermined degree.

According to a first embodiment of the measuring device electronics of the invention, it is provided that, for producing the first reference clock signal, the first clock signal generator has a frequency divider for the working clock signal.

According to a second embodiment of the measuring device electronics of the invention, it is provided that, for producing the working clock signal, the first clock signal generator has a frequency multiplier for the first reference clock signal, for example, one formed by means of a PLL circuit and/or by means of an FLL circuit.

According to a third embodiment of the measuring device electronics of the invention, it is provided that the clocking frequency of the first reference clock signal is different from the clocking frequency of the second reference clock signal, for instance in such a manner that the clocking frequency of the first reference clock signal is lower than the clocking frequency of the second reference clock signal.

According to a fourth embodiment of the measuring device electronics of the invention, it is provided that the processor is equipped, based on the first reference clock signal as well as based on the second reference clock signal, to detect whether at least one of the two clock signal generators is delivering a reference clock signal with an instantaneous clocking frequency, which deviates by a predetermined degree from the nominal clocking frequency respectively predetermined therefor. Developing this embodiment of the invention further, the processor is furthermore equipped to produce, making use of the two reference clock signals, a report, for example in the form of an alarm, which signals that at least one of the two clock signal generators is delivering a reference clock signal, which has an instantaneous clocking frequency deviating from the nominal clocking frequency respectively predetermined therefor.

According to a fifth embodiment of the measuring device electronics of the invention, it is provided that the processor is equipped to ascertain an instantaneous frequency difference, Δf, defined as a difference between the instantaneous frequency of the first reference clock signal and the instantaneous frequency of the second reference clock signal. Developing this embodiment of the invention further, the processor is equipped, furthermore, to compare the ascertained instantaneous frequency difference with a threshold value predeterminable therefor, which represents a maximum allowable frequency difference. This occurs, for example also in such a manner that, if the ascertained instantaneous frequency difference exceeds the threshold value, the processor produces a report—for example, in the form of an alarm—which signals that at least one of the two clock signal generators is delivering a reference clock signal, which has a clocking frequency differing from a nominal clocking frequency respectively predetermined therefor. For example, the processor can ascertain the instantaneous frequency difference based on a signal frequency difference formed by means of the instantaneous clocking frequency of the first reference clock signal and the instantaneous clocking frequency of the second reference clock and/or based on a frequency quotient formed by means of the instantaneous clocking frequency of the first clock signal and the instantaneous clocking frequency of the second clock signal.

According to a sixth embodiment of the measuring device electronics of the invention, it is provided that the two—for example, equally constructed—clock signal generators are held in the case of undisturbed, steady state operation at the same operating temperature.

According to a seventh embodiment of the measuring device electronics of the invention, it is provided that the first clock signal generator is placed on a substrate—for example, a circuit board—which is, at least as regards its coefficient of thermal expansion, equal to a substrate—for example, a circuit board—on which the second clock signal generator is placed.

According to an eighth embodiment of the measuring device electronics of the invention, it is provided that the first clock signal generator and the second clock signal generator are placed on one and the same substrate, for example, a circuit board.

According to a first further development of the measuring device electronics, the measuring device electronics further comprises: A non-volatile data memory for measuring and/or operating data generated by means of the measuring device electronics.

According to a second further development of the measuring device electronics, the measuring device electronics further comprises: A counter controlled by one of the two reference clock signals and having a count input for the other reference clock signal, namely the one not controlling the counter.

According to a first embodiment of the second further development of the measuring device electronics, it is provided that the reference clock signal present at the count input is that reference clock signal, whose clocking frequency is higher than the clocking frequency of the other reference clock signal, namely that controlling the counter.

According to a second embodiment of the second further development of the measuring device electronics, it is provided that the clocking frequency of the reference clock signal controlling the counter determines a count interval, within which the counter counts clock signals of the reference clock signal present at the count input, for example, beginning at one.

According to a third embodiment of the second further development of the measuring device electronics, it is provided that the processor is equipped, based on a count result for clock signals of the reference clock signal present at the count input delivered by the counter, to detect whether at least one of the two clock signal generators is delivering a reference clock signal with an instantaneous clocking frequency, which deviates by a predetermined degree from the nominal clocking frequency respectively predetermined therefor.

According to a first embodiment of the measuring device of the invention, it is provided that the processor of the measuring device electronics is equipped to ascertain, making use of the working clock signal as a reference—for example, as a time base—as well as making use of the at least one measurement signal, a measured value representing the at least one measured variable.

According to a second embodiment of the measuring device of the invention, it is provided that the measuring device is a measuring device measuring in a time-based and/or a frequency-based manner, for example, a Coriolis mass flow measuring device, an ultrasonic flow measuring device, a vortex flow measuring device, an ultrasonic fill level measuring device, or a microwave fill level measuring device.

According to a first embodiment of the method of the invention, such further comprises a step of storing the ascertained frequency difference in a non-volatile data memory of the measuring device electronics. Developing this embodiment of the method of the invention further, it is furthermore provided that there is stored in the non-volatile data memory a datum stating the point in time of the ascertaining of the frequency difference—for example, a datum in the form of the day and the time of day.

According to a second embodiment of the method of the invention, such further comprises a step of storing the error report in a non-volatile data memory of the measuring device electronics. Developing this embodiment of the method of the invention further, it is furthermore provided that there is stored in the non-volatile data memory a datum stating the point in time of the generating of the error report—for example, a datum in the form of the day and the time of day.

A basic idea of the invention is to test the measuring functionality of measuring devices of the type being discussed by monitoring the clock signal generator clocking the processor ultimately delivering the measured values, as regards the ability of such clock signal generator to function, by means of an additional clock signal generator, in that (reference) clock signals produced independently from one another by means of the two clock signal generators but nevertheless nominally having a fixed frequency relationship are examined as to whether—and, in given cases, to what extent—their instantaneous frequency difference deviates from the nominally predetermined frequency difference, and consequently—to the extent present—a deviation of the instantaneous clocking frequency of the working clock signal from the clocking frequency nominally predetermined therefor can be estimated very reliably. Via such a recurringly performed comparison of the instantaneous frequency difference with the nominal value predetermined therefore, a drift of the frequency difference too high for the desired accuracy of measurement, in the case of which frequency difference thus a disturbance of the constant operation of one of the two clock signal generators, and, in this respect, a corresponding inaccuracy of the measured values determined based on the working clock signal generated by the one clock signal generator is to be attended to, can very quickly be detected and correspondingly be promptly signaled, or also traceably documented, for instance, by a corresponding annotation—in given cases marked with date and time of day—in the "on-board", non-volatile data memory.

BRIEF DESCRIPTION OF THE DRAWINGS

The invention, as well as other advantageous embodiments thereof, will now be explained in greater detail on the basis of the appended drawing, in the figures of which examples of embodiments are presented. Equal parts are provided in all figures with the equal reference characters; when such is required for reasons of perspicuity or when it otherwise appears sensible, already mentioned reference characters are omitted in subsequent figures. Other advantageous embodiments or further developments, especially also combinations of aspects of the invention initially explained only individually, will furthermore become evident from the figures of the drawing, as well as also from the dependent claims per se. The figures of the drawing show as follows:

FIG. 2 shows schematically, in the manner of a block diagram, a measuring device electronics, especially also one suitable for a measuring device according to FIGS. 1a, 1b, with a measuring transducer connected thereto;

DETAILED DESCRIPTION IN CONJUNCTION WITH THE DRAWINGS

Figure 1B:
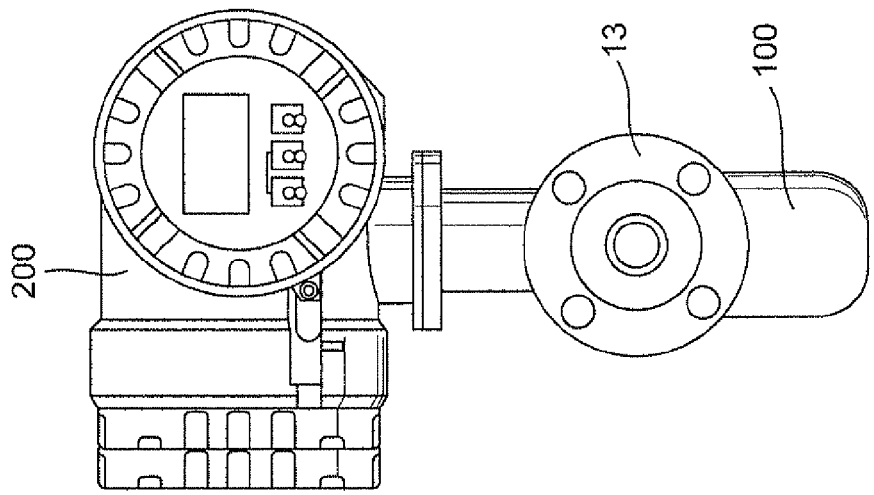
FIG. 1a and FIG. 1b show a measuring device of industrial measurements and automation technology—here embodied as a compact measuring device—for media flowing in pipelines, in different side views.

FIG. 1 shows schematically an example of an embodiment of a measuring device especially suited for application in industrial measurements and automation technology. The measuring device serves to measure at least one physical and/or chemical, measured variable of a medium, such as, for instance, a powder, a low viscosity liquid, a high viscosity paste and/or a gas, etc., conveyed in a medium transporting line, such as, for instance, a pipeline or a flume, or containable in a container, such as, for instance, a tank or a flume, and can be implemented, for example, as shown here, as an in-line measuring device, namely a measuring device insertable into the course of a pipeline (not shown). The measured variable can accordingly be, for example, a mass flow rate or a totaled mass flow of a medium flowing in a pipeline, a medium such as, for instance, a liquid, a powder, a gas, etc., or can also be, for example, a fill level of a liquid in a tank. Alternatively or in supplementation, the measured variable can also be, for example, a density $\rho$ and/or a viscosity $\eta$ of a medium of the aforementioned type.

For registering the at least one measured variable, the measuring device includes: a measuring transducer MT, which interacts with the medium to be measured, and which is here insertable into the course of a pipeline (not shown) and through which the medium to be measured flows during operation, and which serves for transducing the at least one measured variable into at least one measurement signal dependent thereon; and, electrically coupled with measuring transducer MT, a measuring device electronics ME for activating the measuring transducer and for evaluation of measurement signals delivered by the measuring transducer, thus, the at least one measurement signal dependent on the at least one measured variable. It is in such case especially provided that the measuring device is implemented as a measuring device which measures in a time-based and/or a frequency-based manner, namely a measuring device ascertaining measured values on the basis of a measured frequency, a measured period, a measured phase angle and/or a measured time separation of selected reference values of the at least one measurement signal; thus, for example, a Coriolis mass flow measuring device, an ultrasonic flow measuring device, a vortex flow measuring device, an ultrasonic fill level measuring device, a microwave fill level measuring device or a fill level limit switch with a vibrating immersion element. In corresponding manner, the measuring transducer can be, for example: An ultrasonic measuring transducer for registering an echo travel time of ultrasonic waves correlated with a flow velocity of a fluid flowing in a line or correlated with a fill level of a fill substance held in a container, a vortex frequency transducer for registering a shedding frequency of Karman vortices correlated with a flow velocity of a fluid flowing in a line, a microwave module with an antenna or Goubau line for registering an echo travel time of electromagnetic microwaves correlated with a fill level of a fill substance held in a container, or a measuring transducer of vibration type with vibrating measuring tube for registering a phase shift of local vibrations of the measuring tube, as correlated with a mass flow rate of a medium flowing through said measuring tube and/or for registering a vibration frequency, which is correlated with a density of the medium located in the measuring tube.

FIG. 2 further shows schematically in the manner of a block diagram an example of an embodiment of a measuring device of the type being discussed—for example, one supplied with electrical energy during operation externally via connecting cable and/or by means of internal energy storers—with a measuring device electronics, and a measuring transducer connected thereto, this measuring transducer being here embodied, by way of example, as a measuring transducer of vibration type with at least one measuring tube, which is insertable into the course of a pipeline, is flowed through during operation by medium to be measured, and is caused to vibrate. The measuring device electronics includes a driver circuit Exc serving for activating the measuring transducer—here namely actively exciting vibrations of the measuring tube—as well as a measuring and evaluating circuit $\mu C$ processing the at least one measurement signal—embodied here as an oscillatory signal representing vibrations of the at least one measuring tube—of the measuring transducer MT—namely a measuring and evaluating circuit $\mu C$ formed by means of at least one processor clocked by a working clock signal clk0. During operation, measuring and evaluating circuit $\mu C$, making use of working clock signal clk0 as reference—for example as a time base or frequency standard—and the at least one measurement signal, delivers measured values representing at least one measured variable, such as an instantaneous mass flow rate or a mass flow totaled over a certain time interval. The at least one processor can be formed, as is quite usual in the case of modern measuring devices or measuring device electronics of the type being discussed, for example, by means of a microprocessor and/or by means of a digital signal processor (DSP). Processors suitable for such applications include, for example, those of the type SAM7CI of the firm, ATMEL Corp.

For producing the working clock signal clk0 clocking the processor, a first clock signal generator CSG1 is furthermore provided in the measuring device electronics. The clock signal generator CSG1 is, in such case, equipped in such a manner that the working clock signal clk0 generated therewith nominally has a constant clocking frequency $f_{clk0\_DES}$ (where DES stands herein for DESIRED). The clock signal generator CSG1 can be formed, for example, by means of a quartz oscillator and/or by means of a PLL circuit (phase locked loop) and/or by means of an FLL circuit (frequency locked loop), for example as an integral component of the processor itself or also as a separate assembly implemented peripherally to the processor.

Figure 3A:
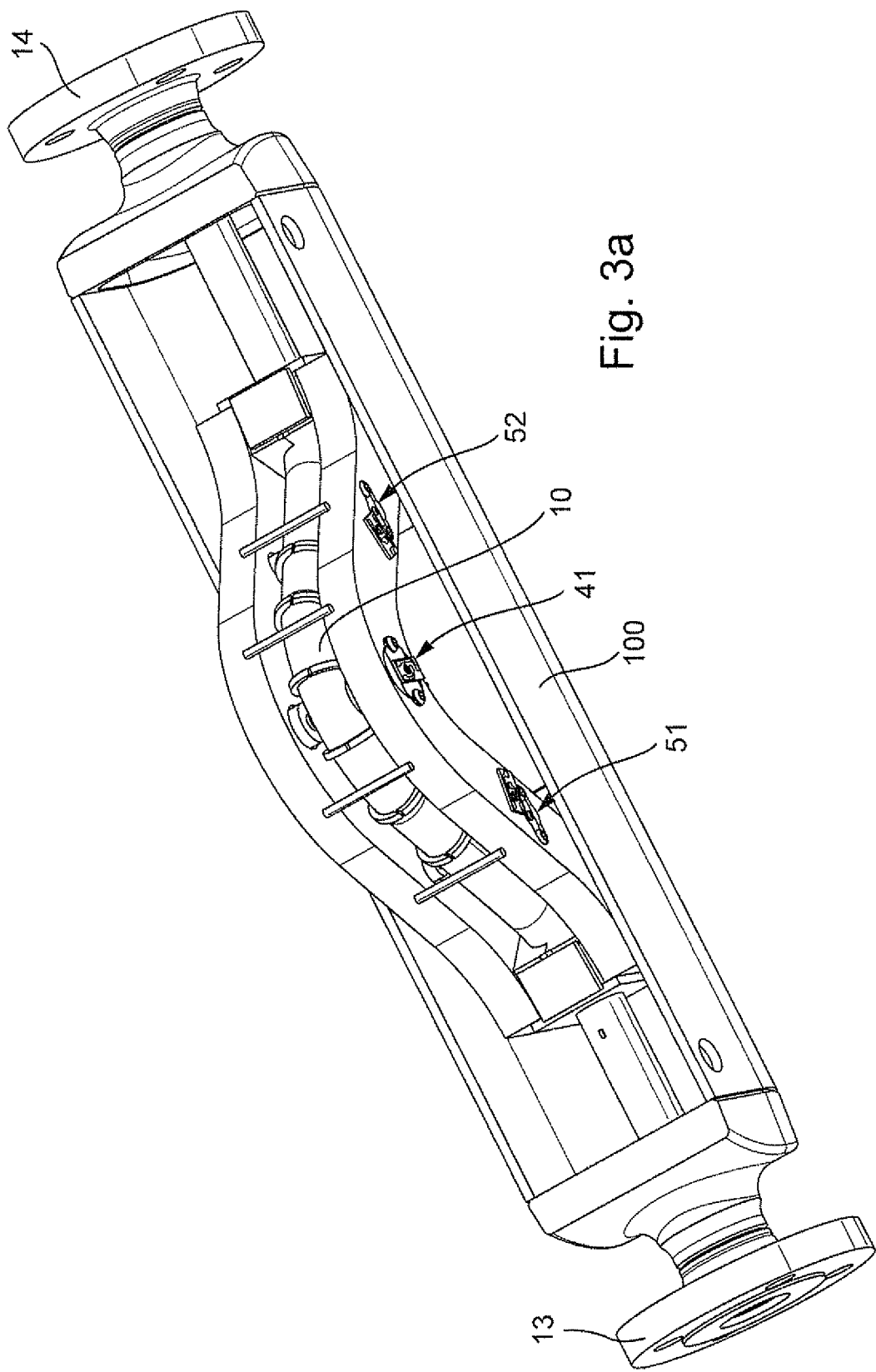
FIG. 3a and FIG. 3b show in partially sectioned and perspective views, a measuring transducer of vibration type, especially one suited for a measuring device according to FIGS. 1a, 1b, with a measuring tube vibrating during operation.
Figure 3B:
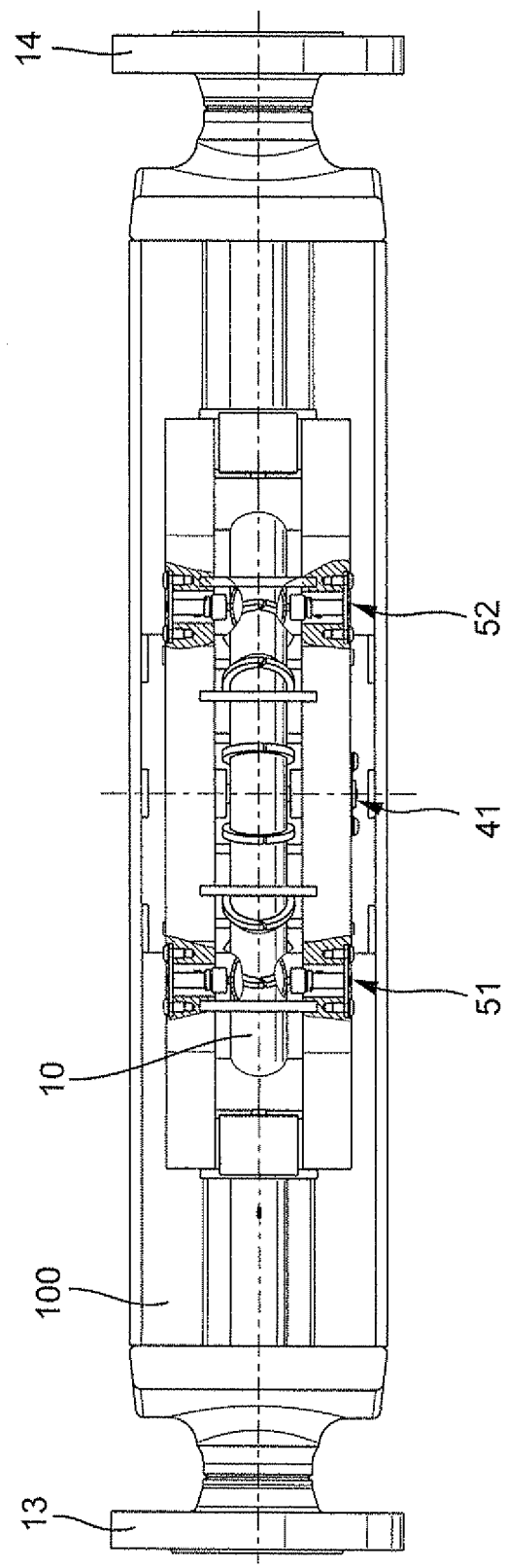

For additional explanation of the technical field of the present invention, FIGS. 3a and 3b show an example of an embodiment of a measuring transducer of vibration type—for example, one suited for application in a Coriolis mass flow measuring device, a density measuring device and/or a viscosity measuring device for flowing media. The measuring transducer MT—principally serving for registering measured variables of flowing media—is inserted during operation in the course of a pipeline (not shown), through which flows the respective medium to be measured—for instance, a powdered, liquid, gaseous or vaporous medium—and serves, as is known, to produce, in the flowing medium, mechanical reaction forces, especially Coriolis forces dependent on the mass flow rate, inertial forces dependent on the density of the medium and/or frictional forces dependent on the viscosity of the medium, which react measurably, especially in a manner registerable by sensor, on the measuring transducer. Derived from these reaction forces describing the medium, by means of measuring and evaluating methods correspondingly implemented in the measuring device electronics, the mass flow rate m and consequently the mass flow, and/or the density $\rho$ and/or a viscosity $\eta$ of the medium, for example, can be measured in manner known to those skilled in the art.

For conveying flowing medium, such a measuring transducer of vibration type generally comprises at least one measuring tube 10—in the example of an embodiment shown in FIGS. 3a and 3b, a single, at least sectionally curved measuring tube 10—accommodated in a measuring transducer housing 100, wherein the measuring tube 10 extends with a wanted oscillatory length between an inlet-side, first measuring tube end 11# and an outlet-side, second measuring tube end 12#, and, for producing the aforementioned reaction forces, is at least at times during operation actively excited to execute mechanical oscillations and caused to vibrate across its wanted oscillatory length, and is in such case repeatedly elastically deformed, oscillating about a static resting position. The wanted oscillatory length corresponds, in such case, to a length of an imaginary central, or also centroidal, axis (imaginary connecting line through the centers of gravity of all cross sectional areas of the measuring tube) extending within the lumen; in the case of a curved measuring tube, thus a stretched length of the measuring tube 10. In its mechanical construction, as well as also its principle of action, the measuring transducer resembles the measuring transducers proposed in U.S. Pat. No. 7,360,451 or U.S. Pat. No. 6,666,098, or also those measuring transducers available from the assignee under the marks "PROMASS H", "PROMASS P" or "PROMASS S". Other measuring transducers can, of course, also serve for implementing the invention; in the case of measuring transducers of vibration type, thus also such with straight measuring tubes and/or more than one measuring tube, thus, for example, two or four measuring tubes, or also such comparable measuring transducers as shown in the previously mentioned US-A 2010/0236338, US-A 2010/0242624, US-A 2010/0242623, U.S. Pat. No. 6,006,609, U.S. Pat. No. 6,513,393, U.S. Pat. No. 7,017,424, U.S. Pat. No. 6,840,109, U.S. Pat. No. 6,920,798, U.S. Pat. No. 5,796,011, U.S. Pat. No. 5,731,527 or U.S. Pat. No. 5,602,345, or, for example, also those measuring transducers available from the assignee under the marks "PROMASS I", "PROMASS M", respectively, "PROMASS E" or "PROMASS F". In accordance therewith, the measuring transducer embodied as a measuring transducer of vibration type can also have a single, straight measuring tube for conveying medium to be measured, or at least two measuring tubes which are, for example, mechanically coupled with one another by means of an inlet-side flow divider and an outlet-side flow divider, in given cases also supplementally by means of inlet and outlet-side coupling elements, and/or measuring tubes equally constructed to one another and/or curved and/or parallel to one another, which, for producing the oscillation signals, vibrate at least at times during operation, for instance, at an equal, shared oscillation frequency, but with opposite phase relative to one another.

For the typical case for such a measuring transducer of vibration type, wherein said measuring transducer MT is to be assembled releasably into the process line (embodied, for example, as a metal pipeline), there are provided, on the inlet side of the measuring transducer, a first connecting flange 13 for connection to a line segment of the process line supplying medium to the measuring transducer, and, on the outlet side, a second connecting flange 14 for connection to a line segment of the process line removing medium from the measuring transducer. In such case, the connecting flanges 13, 14 can, as is quite usual in the case of measuring transducers of the described type, also be integrated terminally into the measuring transducer housing 100.

In the case of measuring transducers of vibration type, the reaction forces required for registering the measured variable in the respective medium to be measured are, as is known, effected by causing the at least one measuring tube to vibrate in an actively excited, oscillatory mode, the so-called wanted mode. Selected as the wanted mode is, in such case, as is quite usual in the case of measuring transducers of the type being discussed, at least one of a large number of natural oscillation modes inherent to the at least one measuring tube, in which said measuring tube executes or can execute resonance oscillations about a resting position and in each case having an oscillation node in the region of its measuring tube ends and having at least one oscillatory antinode in the region of its wanted oscillatory length, wherein the respective oscillation forms of these oscillations, as well as also their respective resonance frequency, is, as is known, decisively dependent also on parameters of the medium flowing in the measuring tube, especially on its instantaneous density and viscosity. Particularly as a result of this dependence on the medium flowing during operation through the at least one measuring tube and consequently through the measuring transducer, the natural oscillation modes are variable during operation of the measuring transducer to a considerable degree. Depending on the manner of construction, application and measuring range, the resonance frequencies can vary within a wanted frequency band ranging over some 100 Hz or even in the kilohertz region. In the case of exciting the at least one measuring tube to one of its instantaneous eigenfrequencies, or also resonance frequencies, an average density of the medium instantaneously flowing through the at least one measuring tube can, on the one hand, thus easily be ascertained based on the instantaneously excited oscillation frequency; on the other hand, the electrical power instantaneously required for maintaining the oscillations excited in the wanted mode can thus also be minimized.

For active excitation of vibrations of the at least one measuring tube, especially also those in the aforementioned wanted mode, the measuring transducer shown here furthermore includes an exciter mechanism 40 formed by means of at least one electro-mechanical—for example, electro-dynamic—oscillation exciter 41 in active connection with the at least one measuring tube, wherein such exciter mechanism 40 serves to cause the at least one measuring tube operationally at least at times to execute oscillations in the wanted mode in each case suitable for the particular measuring—for example, bending oscillations in a natural bending oscillation mode—with oscillation amplitudes in each case sufficiently large for producing and registering the above mentioned reaction forces in the medium, and, respectively, to maintain said oscillations. The at least one oscillation exciter 41—which is, for instance, electrodynamic and formed by means of plunging armature, or solenoid, coils—and consequently the exciter mechanism 40, serves, in such case, especially to convert an electrical excitation power $P_{exc}$ fed from the measuring device electronics by means of at least one electrical driver signal $s_{drv}$ into exciter forces $F_{exc}$—e.g. pulsating or harmonic, and thus essentially sinusoidal, exciter forces $F_{exc}$—which correspondingly act on the at least one measuring tube, and thus bring about the desired oscillations in the wanted mode. For example, the at least one driver signal can simultaneously have a plurality of sinusoidal signal components with signal frequencies differing from one another, of which a signal component—for instance, one at least at times dominating as regards signal power—has a signal frequency corresponding to an instantaneous resonance frequency of a natural mode of oscillation selected as the wanted mode.

In such case, the exciter forces $F_{exc}$—generated by converting electrical excitation power $P_{exc}$ fed into the exciter mechanism—can, in manner known to those skilled in the art, by means of the driver circuit Exc provided in measuring device electronics ME—and here ultimately delivering the driver signal—correspondingly be tuned, for instance, by means of electrical current controllers implemented in the driver circuit and controlling an amplitude (electrical current level) of an electrical current of the driver signal and/or by means of voltage controllers controlling an amplitude (voltage level) of a voltage of the driver signal, and, for example, by means of a phase control loop (PLL—phase locked loop) likewise provided in the operating circuit, as regards their instantaneous frequency, or in the case of a multifrequency excitation, as regards their instantaneous frequencies; compare for this, for example, also U.S. Pat. No. 4,801,897 or U.S. Pat. No. 6,311,136. The construction and application of the aforementioned phase control loop for active excitation of the measuring tubes to oscillations at one of their mechanical eigenfrequencies is described at length, for example, in U.S. Pat. No. 4,801,897. Of course, also other driver circuits known by those skilled in the art to be suitable for setting the exciter energy $E_{exc}$ can be used, for example, also those according to the previously mentioned state of the art, for instance, the previously mentioned U.S. Pat. No. 4,777,833, U.S. Pat. No. 4,801,897, U.S. Pat. No. 4,879,911, U.S. Pat. No. 5,009,109, U.S. Pat. No. 5,024,104, U.S. Pat. No. 5,050,439, U.S. Pat. No. 5,804,741, U.S. Pat. No. 5,869,770, U.S. Pat. No. 6,073,495 or U.S. Pat. No. 6,311,136. Furthermore, as regards an application of such driver circuits for measuring transducers of vibration type, reference is made to the measuring device electronics provided with measurement transmitters in the series "PROMASS 83" as available, for example, from the assignee in connection with such measuring transducers of vibration type, namely measuring transducers of the series "PROMASS E", "PROMASS F", "PROMASS H", "PROMASS I", "PROMASS P" or "PROMASS S". Their driver circuit is, for example, in each case embodied in such a manner that bending oscillations in the wanted mode are controlled at a constant amplitude, and thus one also largely independent of the density, $\rho$.

For registering vibrations of the at least one measuring tube 10, particularly also those actively excited by means of the at least one oscillation exciter, the measuring transducer MT includes, furthermore, a corresponding sensor arrangement 50. This comprises, as is also schematically presented in FIGS. 3a, 3b, a first oscillation sensor 51—for example, an electrodynamic, first oscillation sensor 51—arranged, here spaced apart from the at least one oscillation exciter, on the at least one measuring tube 10, wherein this first oscillation sensor 51 delivers a first oscillatory signal $s_{sens1}$ representing vibrations of the measuring tube 10 and serving as a measurement signal of the measuring transducer, for example, an electrical (alternating) voltage corresponding to the oscillations, with an amplitude (voltage level) dependent on an instantaneous amplitude of the oscillations of the at least one measuring tube. The oscillatory signal $s_{sens1}$ can basically contain a plurality of signal components differing as regards their signal frequency, particularly also such, which correspond with the actively excited and, in this respect, desired oscillations of the at least one measuring tube. Furthermore, the sensor arrangement can, as is usual in the case of such measuring transducers of vibration type—which, for instance, also serve for registering the mass flow rate—have a second oscillation sensor 52, which is, for example, electrodynamic and constructed equally to the first oscillation sensor 51, which is arranged spaced apart from the first oscillation sensor 51 on the at least one measuring tube 10, and which delivers a second oscillatory signal $s_{sens2}$ likewise representing vibrations of measuring tube 10 and serving as a further measurement signal of the measuring transducer.

The at least one oscillation sensor 51, and consequently the sensor arrangement 50 formed therewith, is, furthermore, as is usual in the case of such measuring transducers, coupled in a suitable manner—for example, wired via connecting lines—with a measuring and evaluating circuit correspondingly provided in the measuring device electronics, and here namely also formed by means of the at least one processor μC. The at least one measurement signal delivered by the measuring transducer—here thus embodied as an oscillatory signal—is, as is also shown in FIG. 2, fed to the measuring device electronics ME, and there to the measuring and evaluating circuit provided therein. Of course, the at least one oscillatory signal, or the oscillation signals $s_{sense1}$, $s_{sense2}$, are conditioned in a manner suitable for processing in the processor, and, consequently, the measuring and evaluating circuit formed therewith, and are especially converted by means of corresponding A/D converters into corresponding digital signals; compare for this, for example, the previously mentioned U.S. Pat. No. 6,311,136 or U.S. Pat. No. 6,073,495, or also the aforementioned measurement transmitters of the series "PROMASS 83". Accordingly, the at least one measurement signal is first preprocessed, especially preamplified, filtered and digitized, by means of a corresponding input circuit Cl of the measuring device electronics, namely one having an analog-to-digital converter A/D, in order thereafter to be capable of being suitably evaluated by means of the processor, and namely to be converted into the previously mentioned, measured values representing, for example, a mass flow rate, a totaled mass flow and/or a density and/or a viscosity of the medium to be measured; this occurs, in given cases, also taking into consideration electrical excitation power fed by means of the at least one driver signal into the exciter mechanism, and consequently also converted therein. In such case, working clock signal clk0 can furthermore also be used, matched to the working clock speed of the processor, to clock input circuit Cl or the A/D-transducer provided therein, or to serve as a basis for a corresponding working clock signal clk0' for input circuit Cl.

Used as input circuit Cl, as well as also as measuring and evaluating circuit μC can be established circuit technologies or control or evaluating programs such as, for instance, those already applied in conventional Coriolis mass flow measuring devices for the purpose of converting the oscillation signals or for ascertaining mass flow rates and/or totaled mass flows, etc. The program code for such control programs serving for control of the measuring transducer and/or evaluating programs serving for generating measured values can, for example, be lastingly stored in a non-volatile data memory EEPROM of the measuring device electronics in given cases serving for storing measured values generated by means of the measuring device over a longer period of time, and, in the case of starting up the measuring device electronics, be loaded into a volatile data memory RAM, e.g. one integrated in the processor. Equally, by means of measuring device electronics ME, measured values generated during operation can be loaded to such a—in given cases, also the same— volatile data memory RAM, and correspondingly held for later further processing.

In the case of application in a Coriolis mass flow measuring device, the measuring device electronics especially serves, making use of the measurement signals generated by the measuring transducer in the case of a measuring tube 10 oscillating partially in wanted and partially in Coriolis mode, namely based on a phase difference detected between the oscillation signals $s_{sens1}$, $s_{sesn2}$ of the first and second oscillation sensors 51, 52, recurringly to ascertain as exactly as possible a mass flow measured value $X_m$, which represents the mass flow rate, m, to be measured for the medium guided through the measuring transducer. Alternatively thereto or in supplementation thereof, the measuring and evaluating circuit, as is quite usual in the case of measuring devices formed by means of a measuring transducer of vibration type, can, in given cases, also be used to ascertain a density measured value $X_\rho$ representing the density of the medium and/or a viscosity measured value $X_\eta$ representing a viscosity of the medium; compare for this also the previously mentioned U.S. Pat. No. 7,284,449, U.S. Pat. No. 7,017,424, U.S. Pat. No. 6,910,366, U.S. Pat. No. 6,840,109, U.S. Pat. No. 5,576,500 or U.S. Pat. No. 6,651,513.

The measured values generated by means of the measuring and evaluating circuit can be displayed, for example, on-site. For on-site visualizing of measured values produced internally in the measuring device and/or in given cases system status reports generated internally in the measuring device, such as, for instance, an error report or an alarm, the measuring device can have, for example, a display and servicing element HMI which is in communication with the measuring device electronics and in given cases is also portable, such as, for instance, an LCD, OLED or TFT display placed in the electronics housing behind a window correspondingly provided therein as well as a corresponding input keypad and/or a touch screen. Advantageously, the measuring device electronics—which is, for example, also remotely parameter-able—can furthermore be designed in such a manner that, during operation of the measuring device, it can exchange measuring and/or other operating data—such as, for instance, current measuring and/or system diagnosis values, or setting values serving for control of the measuring device—with a superordinated electronic data processing system—for example, a programmable logic controller (PLC), a personal computer and/or a work station—via a data transmission system, for example, a fieldbus system and/or wirelessly via radio. Furthermore, measuring device electronics ME can be designed in such a manner that it can be fed by an external energy supply, for example, also via the aforementioned fieldbus system. For the case in which measuring device 1 is equipped for connection to a fieldbus or other communication system, measuring device electronics ME—which is, for example, also (re-) programmable on-site and/or via a communication system—can additionally have a corresponding communication interface for data communication, e.g. for sending measuring and/or operating data, and consequently the measured values representing at least one measured variable, to the already mentioned programmable logic controller or to a superordinated process control system, and/or for receiving settings data for the measuring device. Particularly for the case, in which the measuring device is provided for coupling to a fieldbus or other communication system, measuring device electronics ME consequently furthermore includes a communication interface COM for data communication, embodied according to one of the relevant industry standards. Moreover, measuring device electronics ME can have, for example, such an internal energy supply circuit ESC, which, during operation, is fed via the aforementioned fieldbus system from an external energy supply provided in the aforementioned data processing system. In such case, the measuring device electronics can furthermore be embodied in, for example, such a manner that it is electrically connectable by means of a two-wire connection 2 L—configured, for example, as a 4-20 mA current loop—with the external electronic data processing system, and can be supplied thereby with electrical energy, as well as transmit measured values to the data processing system; the measuring device can, however, for example, also be embodied as a so-called four-conductor measuring device, in the case of which the internal energy supply circuit ESC of measuring device electronics ME is connected by means of a first pair of lines with an external energy supply and the internal communication circuit COM of the measuring device electronics ME is connected by means of a second pair of lines with an external data processing circuit or an external data transmission system.

Figure 1A:
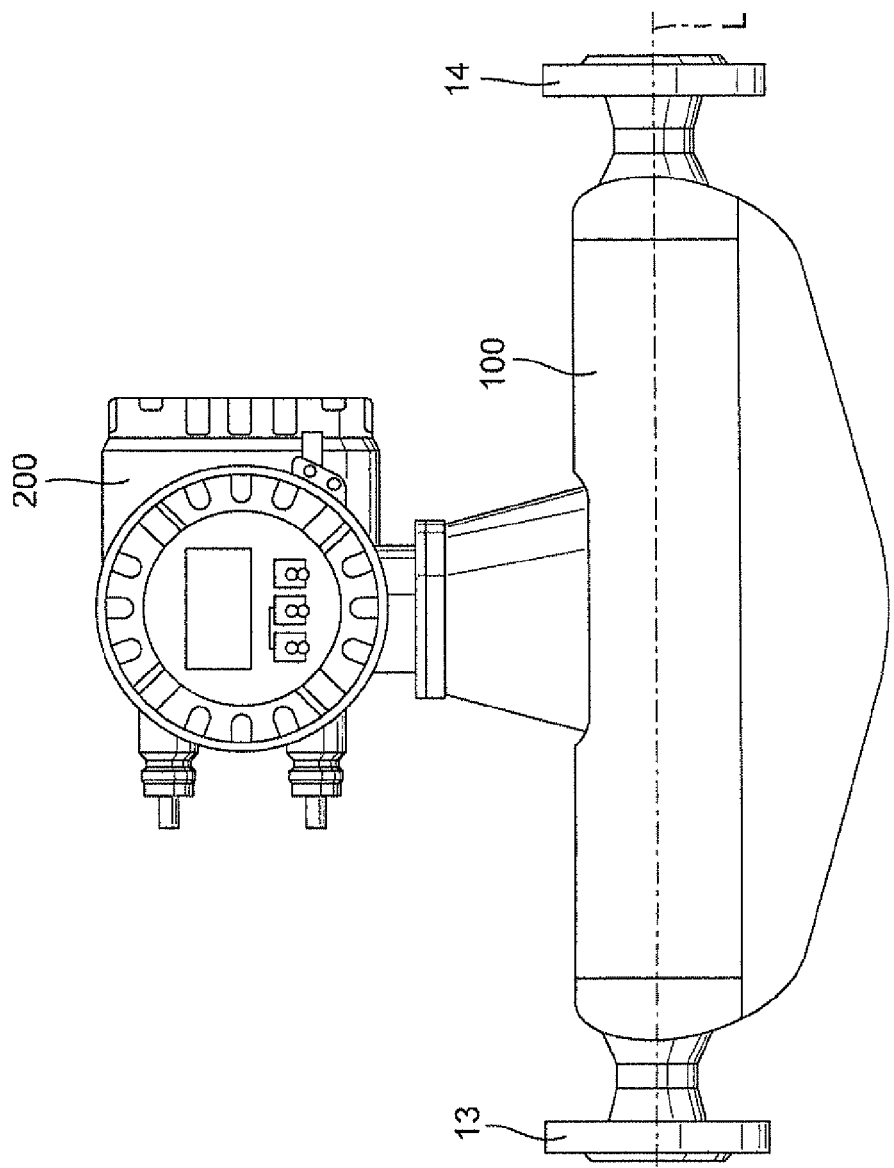

The measuring device electronics, and consequently the driver circuit Exc and the measuring and evaluating circuit μC, as well as other electronics components of the measuring device electronics serving for operation of the measuring device, such as, for instance, the mentioned internal energy supply circuit ESC for providing internal supply voltages $U_N$ and/or the mentioned communication circuit COM serving for connection to a superordinated measurement data processing system and/or a fieldbus are furthermore advantageously accommodated in a corresponding electronics housing 200, especially an electronics housing 200 embodied in an impact-resistant and/or also explosion-resistant manner, and/ or one embodied in a hermetically sealed manner and/or constructed modularly. The electronics housing can be arranged, for example, removed from the measuring transducer, or, as shown in FIGS. 1a, 1b, be affixed, forming a single compact device, directly on measuring transducer MT; for example, externally affixed on transducer housing 100. In the case of the example of an embodiment shown here, a necklike transition piece serving for holding the electronics housing 200 is consequently furthermore placed on the transducer housing 100. Within the transition piece, an accommodation for electrical connecting lines, for example, an accommodation manufactured by means of glass and/or plastic potting compound or a hermetically sealed and/or pressure-resistant accommodation, can furthermore be arranged between measuring transducer MT—here, for example, thus the oscillation exciters and sensors placed therein—and measuring device electronics ME.

As already previously mentioned, in the case of measuring device electronics of the type being discussed, and consequently measuring devices formed therewith—particularly, however, also those which measure in a time-based and/or a frequency-based manner—it is of immense importance, that the working clock signal clk0 clocking the processor and ultimately serving as a reference—namely as time base or frequency standard—for the at least one measurement signal or the measured values derived therefrom always has during operation, and namely in the case of all operating conditions specified for the measuring device, an instantaneous clocking frequency, which exactly corresponds to the nominal clocking frequency $f_{clk0\_DES}$, and consequently is reliably constant over as broad an operating range as possible and as long a duration of operation as possible. In other words, for maintaining the accuracy of measurement designated for the particular measuring device, it is essential that the clock signal generator to a large degree always runs uniformly, and namely delivers a working clock signal with a non-varying (or at most, negligibly varying) clocking frequency.

For estimating a risk that the clock signal generator is no longer sufficient for the stated requirements regarding its precision, and consequently for verifying the measuring functionality of the measuring device electronics or for validating the measured values ultimately produced by means of the measuring device also during operation of the measuring device, it is consequently provided in the case of the measuring device electronics of the invention, that, in addition to working clock signal clk0, the clock signal generator CSG1 furthermore also produces a first reference clock signal clk1 dependent thereon, having a nominally constant clocking frequency $f_{clk1\_DES}$, which is smaller than the clocking frequency, $f_{clk0\_DES}$, of the working clock signal by a predetermined ratio $R_{clk1}$ ($R_{clk1}=f_{clk0\_DES}/f_{clk1\_DES}$), especially more than two times smaller ($R_{clk1}>2$). Moreover, the measuring device electronics includes a second clock signal generator CSG2, which produces a second reference clock signal clk2 independent of working clock signal clk0—and here particularly serving as a reference for working clock signal clk0—with a nominally constant clocking frequency $f_{clk2\_DES}$, which is likewise smaller than the clocking frequency, $f_{clk0\_DES}$, of the working clock signal by a predetermined ratio $R_{clk2}$ ($R_{clk2}=f_{clk0\_DES}/f_{clk2\_DES}$), thus, for example, in turn, more than a two times ($R_{clk2}>2$) smaller. Clock signal generator CSG2 can—for instance, analogously to the clock signal generator CSG1—be formed, for example, by means of a quartz oscillator, by means of a PLL circuit and/or by means of an FLL circuit. According to an additional embodiment of the invention, the two (for example, equally constructed) clock signal generators CSG1, CSG2 are in such case furthermore equipped in such a manner that the clocking frequency of the first reference clock signal clk1 differs from the clocking frequency of the second reference clock signal clk2, so that for the clocking frequency of both reference clock signals, $f_{clk1\_DES} < > f_{clk2\_DES}$, and consequently $R_{clk1} < > R_{clk2}$, is true. This occurs especially also in such a manner that the clocking frequency of the first reference clock signal clk1 is lower than the clocking frequency of the second reference clock signal clk2, and consequently, $f_{clk1\_DES} < f_{clk2\_DES}$, and, respectively, $R_{clk1} > R_{clk2}$.

Based on the two reference clock signals clk1, clk2—which are certainly generated independently of one another, but as a result of their respective, nominally constant, clock frequencies $f_{clk1\_DES}$ and $f_{clk2\_DES}$, have nevertheless a nominally constant, and consequently invariant frequency relationship ($f_{clk1\_DES}/f_{clk2\_DES}$=constant) relative to one another—and via a simple, and in given cases recurringly performed observation of said frequency relationship, for example, via a simple comparison of a characterizing value derived from both instantaneous clock frequencies $f_{clk1\_ACT}$, $f_{clk2\_ACT}$ (where ACT stands herein for ACTUAL) and with a threshold value predetermined therefor, it can thus very quickly be recognized whether at least one of the two clock signal generators CSG1, CSG2 delivers a reference clock signal with an instantaneous clocking frequency $f_{clk1\_ACT}$, or $f_{clk2\_ACT}$, which deviates from the nominal clocking frequency respectively predetermined therefore, $f_{clk1\_DES}$, respectively $f_{clk2\_DES}$, by a predetermined degree $\Delta f_{allowed}$ or beyond, and, as a result of this, care is to be taken that measured values ascertained by means of the processor can be erroneous by more than a predetermined degree $\Delta err_{allowed}$-$\Delta f_{allowed}$ allowable or acceptable therefor, and consequently may not be reliable. Accordingly, according to an additional embodiment of the invention, the processor is equipped, based on the first reference clock signal clk1 as well as based on the second reference clock signal clk2, to detect whether at least one of the two clock signal generators is delivering a reference clock signal with an instantaneous clocking frequency, $f_{clk1\_ACT}$, or $f_{clk2\_ACT}$, which deviates from the respective nominal clocking frequency predetermined therefor, $f_{clk1\_DES}$, or $f_{clk2\_DES}$, by a predetermined degree $\Delta f_{allowed}$ or more. In such case, it is especially furthermore provided, that the processor is able to ascertain an instantaneous frequency difference, $\Delta f$, defined as a difference between the instantaneous clocking frequency $f_{clk1\_ACT}$ of the first reference clock signal clk1 and the instantaneous clocking frequency $f_{clk2\_ACT}$ of the second reference clock signal clk2. This particularly occurs also in order thereafter to compare the ascertained instantaneous frequency difference, $\Delta f$, with a threshold value predeterminable therefor, which represents a maximum allowable frequency difference $\Delta f_{allowed}$, or, based on this comparison, namely if the instantaneous clock frequencies of the two reference clock signals deviate from one another by more than a predetermined degree, and consequently the ascertained instantaneous frequency difference $\Delta f$ exceeds the threshold value, to produce an error report, report err1 (or an accordingly coded error signal)—in given cases also declared as alarm and/or initiating another testing of the measuring device—which signals that at least one of the two clock signal generators CSG1, CSG2 delivers a reference clock signal, which has a clocking frequency differing from a nominal clocking frequency respectively predetermined therefor, and that measured values ascertained by the processor are erroneous beyond a predetermined degree, respectively, unreliable, and consequently are to be treated as invalid. The aforementioned comparison can, as schematically presented in FIG. 4, be performed in very simple manner, e.g. by means of a digital comparator C—for instance, one implemented in the processor—which compares the ascertained frequency difference $\Delta f$ at a comparison input COMP with the numerical value present at a reference input$_{REF}$ at the run time of the processor, representing the predetermined threshold value $\Delta f_{allowed}$.

The instantaneous frequency difference $\Delta f$ can be ascertained, for example, by means of processor µC based on a frequency difference formed by means of the instantaneous clocking frequency $f_{clk1\_ACT}$ of the first reference clock signal clk1 and the instantaneous clocking frequency $f_{clk2\_ACT}$ of the second reference clock signal clk2, for example in such a manner that $\Delta f \sim f_{clk1\_ACT} - f_{clk2\_ACT}$, and/or based on a frequency quotient formed by means of the instantaneous clocking frequency of the first clock signal and the instantaneous clocking frequency of the second clock signal, for example, so that $\Delta f \sim f_{clk1\_ACT}/f_{clk2\_ACT}$. Alternatively or in supplementation, the processor can ascertain the instantaneous frequency difference $\Delta f$, moreover, also based, for example, on one or more of the relationships: $\Delta f \sim f_{clk2\_ACT} - f_{clk1\_ACT}$, $\Delta f \sim f_{clk2\_ACT}/f_{clk1\_ACT}$, $\Delta f \sim 1 - f_{clk2\_ACT}/f_{clk1\_ACT}$, $\Delta f \sim 1 - f_{clk1\_ACT}/f_{clk2\_ACT}$, and, moreover, based on practically any function, whose function values ultimately serving namely as a measure for the frequency difference either become larger in the case of a growing deviation of the two clock frequencies $f_{clk1\_ACT}$, $f_{clk2\_ACT}$ from one another, or, conversely, become correspondingly smaller.

The respective ascertained frequency difference $\Delta f$ or the error report err1 in given cases generated based on this can, for instance, for the purpose of assuring a traceability of possible measuring device errors or measured value errors required on the part of the operator of the measuring point formed by means of the measuring device and/or on the part of the authorities overseeing said measuring point and/or for the purpose of a detailed documentation of the history of the measuring device, in each case be stored in the mentioned non-volatile data memory EEPROM of the measuring device electronics, in given cases thus also in a corresponding historical data set of frequency differences $\Delta f$ recurringly recorded over a longer period of time, or error reports err1 in given cases derived therefrom. In such case, a datum stating a respective point in time (thus date and time of day) of the ascertaining of the (recorded) frequency difference $\Delta f$ or of the generating of the (recorded) error report, for example, can advantageously also in each case be supplementally suitably stored along with this in the non-volatile data memory EEPROM.

Figure 4:
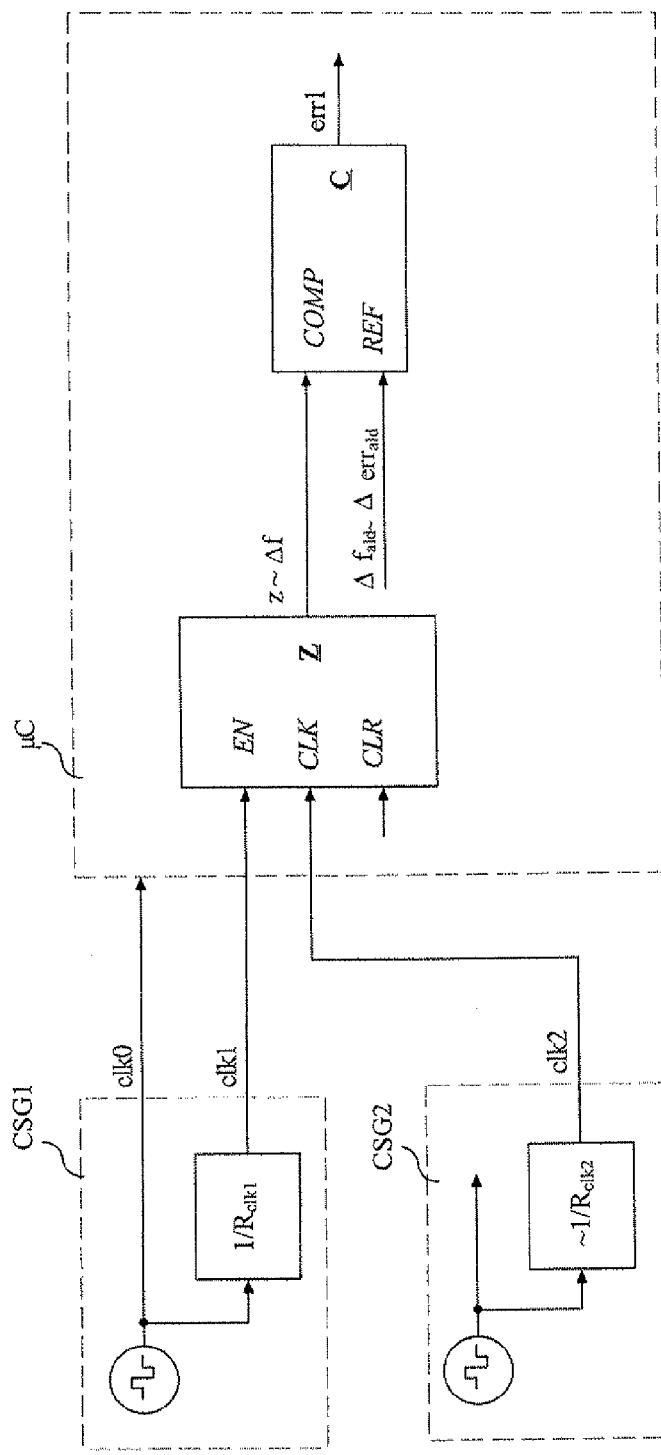
FIG. 4 shows a circuit portion, especially also one suitable for implementation in a measuring device electronics according to FIG. 2, respectively serving for verification of said measuring device electronics, with two clock signal generators, a counter for (reference) clock signals generated by means of the two clock signal generators and a comparator for comparison of a count result delivered by the counter with a reference value predetermined therefor.

As is, for example, also schematically presented in FIG. 4, serving for ascertaining the instantaneous frequency difference $\Delta f$ can be a counter Z, constructed, for instance, as a synchronous dual counter, with an enable input EN for one of the two reference clock signals, for example the first reference clock signal clk1, so that the counter Z is thus controlled by said reference clock signal, and with a count input for the other reference clock signal, namely the reference clock signal not controlling the counter, for example the second reference clock signal clk2. In accordance therewith, the reference clock signal present at the count input is preferably that reference clock signal, whose clocking frequency is higher than the clocking frequency of the other reference clock signal, namely the reference clock signal controlling the counter. Thus, the clocking frequency of the—low frequency or "slower"—reference clock signal controlling the counter determines a count interval, within which the counter clock signals of the—higher frequency, or "faster"—reference clock signal present at the count input counts, preferably in each case beginning at one. Accordingly, in the case of this embodiment of the invention, the processor is furthermore equipped, based on a count result z delivered by the counter Z for clock signals of the reference clock signal present at the count input CLK, to detect whether at least one of the two clock signal generators CSG1, CSG2 delivers a reference clock signal with an instantaneous clocking frequency, $f_{clk1\_ACT}$, or $f_{clk2\_ACT}$, which deviates from the respective nominal clocking frequency predetermined therefor, $f_{clk1\_DES}$, or $f_{clk2\_DES}$, by the correspondingly predetermined degree $\Delta f_{allowed}$ ($\Delta f_{allowed} \sim \Delta err_{allowed}$). In FIG. 4, the subscript 'allowed' is abbreviated as 'ald'.

For the purpose of simplifying the setting of a clocking frequency ratio $f_{clk1\_DES}/f_{clk2\_DES}$ in each case suited for the particular type of application, such clocking frequency ratio $f_{clk1\_DES}/f_{clk2\_DES}$ being defined as a ratio of the nominal clocking frequency of the first reference clock signal to the nominal clocking frequency of the second reference clock signal, and consequently for producing reference clock signal clk1 with a nominal clocking frequency $f_{clk1\_DES}$ optimally matched to said type of application, according to an additional embodiment of the invention, and as is also schematically presented in FIG. 4, clock signal generator CSG1 is formed by means of a frequency divider—here namely having a divider ratio $1/R_{clk1}$ corresponding to the predetermined ratio $R_{clk1}$—for the working clock signal clk0. The clock signal generator CSG1/frequency divider is operated by an oscillator, for example, a quartz oscillator, a PLL circuit and/or an FLL circuit. As an alternative to the specified case, in which reference clock signal clk1 is derived (by means of frequency dividing) from working clock signal clk0, working clock signal clk0 can, for example, also, on the other hand, be derived from the first reference clock signal clk1, for instance by the clock signal generator CSG1 having a frequency multiplier—formed, for example, by means of a PLL circuit and/or by means of an FLL circuit—for the first reference clock signal clk1. Furthermore, as is also schematically presented in FIG. 4, for the purpose of an as simple a setting of the clocking frequency ratio $f_{clk1\_DES}/f_{clk2\_DES}$ as possible, the second clock signal generator CSG2 can also be formed by means of a frequency divider driven by an oscillator—for example, a quartz oscillator—a PLL circuit and/or an FLL circuit, which, matched to the reference clock signal delivered by the first clock signal generator as well as the clocking frequency ratio $f_{clk1\_DES}/f_{clk2\_DES}$ ultimately to be set, has a divider ratio $1/R_{clk2}$ which is correspondingly reversely proportional to the divider ratio $R_{clk2}$.

In order to minimize or largely exclude possible disturbing influences (stemming from the measuring device electronics itself or individual components thereof, particularly also possible disturbing influences as a result of temperature fluctuations over time within the measuring device electronics) on the two clock signal generators, and consequently on the working clock signal or reference clock signal respectively generated therewith, according to an additional embodiment of the invention, it is provided that the first clock signal generator is placed on a substrate, for instance a circuit board, for which, at least as regards its coefficient of thermal expansion, especially also as regards its specific heat capacity and/or thermal conductivity, is equal to a substrate, on which the second clock signal generator is placed. This can be achieved, for example, in a simple as well effective manner, for example, by placing the first clock signal generator and the second clock signal generator together on one and the same substrate, for example, on one and the same circuit board. Furthermore, it can be of advantage, particularly also for preventing increased or also unallowably high frequency differences ($\Delta f > \Delta f_{allowed}$) as a result of possible temperature gradients within the measuring device electronics, to hold the two clock signal generators CSG1, CSG2, at least in the undisturbed, steady operational case, at the same operating temperature; thus for example, to arrange them along a shared isotherm which extends in as locationally fixed a manner as possible or as invariant a manner as possible in the measuring device electronics. This can be achieved, for example, by arranging the two clock signal generators—which are, in given cases, also placed on one and the same substrate— within the measuring device electronics at as small a distance as possible from one another, and, consequently, within the electronics housing.

With the present invention, measuring devices of the aforementioned type can thus recurringly—especially also regularly and/or without interruption of actual measurement operation—be tested as to whether the working clock ultimately serving as a basis for the measured values generated by means of the processor signal reliably exhibits or has exhibited a clocking frequency lying within the specified tolerance limits, or whether the clock signal generator CSG1 delivering the working clock signal after a certain point in time, for instance as a result of aging and/or outer disturbing influences, is to be graded as no longer corresponding to specification, and consequently as no longer reliable. In other words, a deviation of an actual, instantaneous clocking frequency, $f_{clk0\_ACT}$, of the working clock signal from the desired clocking frequency nominally predetermined therefor, $f_{clk0\_DES}$, can thus very simply, as well very reliably be estimated during operation.

The invention claimed is:

1. A measuring device electronics for a measuring device, said measuring device electronics comprising:
    a processor;
    a first clock signal generator for producing a working clock signal clocking the processor with a nominally constant clocking frequency and for producing a first reference clock signal dependent on the working clock signal, said first reference clock signal exhibiting a nominally constant clocking frequency which is smaller than the clocking frequency of the working clock signal by a predetermined factor; and
    a second clock signal generator for producing a second reference clock signal independent of the working clock signal, said second reference clock signal exhibiting a nominally constant clocking frequency which is smaller than the clocking frequency of the working clock signal by a predetermined factor,
    wherein said processor is adapted to detect, based on said first reference signal as well as based on said second reference clock signal, whether at least one of said first and second clock signal generators is delivering a reference clock signal with an instantaneous clocking frequency, which deviates by a predetermined degree from the nominal clocking frequency respectively predetermined therefor.

2. The measuring device electronics as claimed in claim 1, wherein:
    for producing said first reference clock signal, said first clock signal generator includes a frequency divider for said working clock signal.

3. The measuring device electronics as claimed in claim 1, wherein:
    for producing the working clock signal, said first clock signal generator includes a frequency multiplier for the first reference clock signal.

4. The measuring device electronics as claimed in claim 1, wherein:
    the clocking frequency of said first reference clock signal differs from the clocking frequency of said second reference clock signal.

5. The measuring device electronics as claimed in claim 1, further comprising:
    a counter controlled by one of said two reference clock signals, said counter including a count input for the other reference clock signal, not controlling said counter.

6. The measuring device electronics as claimed in claim 5, wherein:
    said reference clock signal present at the count input is that reference clock signal, whose clocking frequency is higher than the clocking frequency of the other reference clock signal, namely that controlling the counter.

7. The measuring device electronics as claimed in claim 1, wherein:
    said processor is equipped, by making use of the two reference clock signals, to produce a report, which signals, that at least one of the two clock signal generators is delivering a reference clock signal, which exhibits an instantaneous clocking frequency deviating from the nominal clocking frequency respectively predetermined therefor.

8. The measuring device electronics as claimed in claim 1, wherein:
    said processor is adapted to ascertain an instantaneous frequency difference defined as a difference between the instantaneous clocking frequency of said first reference clock signal and the instantaneous clocking frequency of said second reference clock signal.

9. The measuring device electronics as claimed in claim 8, wherein:
    said processor is adapted to compare the ascertained instantaneous frequency difference with a threshold value predeterminable therefor, which represents a maximum allowable frequency difference.

10. The measuring device electronics as claimed in claim 9, wherein:
    said processor is adapted to produce, if the ascertained instantaneous frequency difference exceeds the threshold value, a report which signals that at least one of the two clock signal generators is delivering a reference clock signal, which exhibits a clocking frequency differing from a nominal clocking frequency respectively predetermined therefor.

11. The measuring device electronics as claimed in claim 8, wherein:
    said processor ascertains the instantaneous frequency difference based on a frequency difference formed by means of the instantaneous clocking frequency of said first reference clock signal and the instantaneous clocking frequency of said second reference clock signal.

12. The measuring device electronics as claimed in claim 8, wherein:
    said processor ascertains the instantaneous frequency difference based on a frequency quotient formed by means of the instantaneous clocking frequency of said first clock signal and the instantaneous clocking frequency of said second clock signal.

13. The measuring device electronics as claimed in claim 1, wherein:
    said two clock signal generators are held in case of undisturbed, steady state operation at the same operating temperature.

14. The measuring device electronics as claimed in claim 1, wherein:
    said first clock signal generator is placed on a substrate which, at least as regards its coefficient of thermal expansion, is equal to a substrate on which said second clock signal generator is placed.

15. The measuring device electronics as claimed in claim 1, wherein:
    said first clock signal generator and said second clock signal generator are placed on one and the same substrate.

16. The measuring device electronics as claimed in claim 1, further comprising:
a non-volatile data memory for measuring and/or operating data generated by means of the measuring device electronics.

17. The measuring device electronics as claimed in claim 5, wherein said clocking frequency of the reference clock signal controlling the counter determines a count interval, within which the counter counts clock signals of the reference clock signal present at the count input.

18. The measuring device electronics as claimed in claim 1, wherein the processor is embodied as a digital signal processor.

19. A method for testing a measuring device for measuring at least one physical and/or chemical, measured variable of a medium conveyed in a line or in a container, wherein the measuring device includes a measuring device electronics and a measuring transducer electrically coupled with said measuring device electronics for transducing the at least one measured variable into at least one measurement signal dependent thereon, and wherein the measuring device electronics includes:
a processor,
a first clock signal generator for producing a working clock signal clocking the processor with a nominally constant clocking frequency and for producing a first reference clock signal dependent on the working clock signal, said first reference clock exhibiting a nominally constant clocking frequency, which is smaller than the clocking frequency of the working clock signal by a predetermined factor,
and a second clock signal generator for producing a second reference clock signal independent of the working clock signal, said second reference clock exhibiting a nominally constant clocking frequency, which is smaller than the clocking frequency of the working clock signal by a predetermined factor, said method comprising:
producing the working clock signal by means of the first clock signal generator and clocking the processor with said working clock signal;
producing the first reference clock signal by means of the first clock signal generator and producing the second reference clock signal by means of the second clock signal generator;
producing, by means of the processor, measured values representing said at least one measured variable;
ascertaining a frequency difference, which represents a difference between the instantaneous clocking frequency of the first reference clock signal and the instantaneous clocking frequency of the second reference clock signal; and
generating an error report, said error report signaling that at least one of the two clock signal generators is delivering a reference clock signal with an instantaneous clocking frequency, which deviates by a predetermined degree from a nominal clocking frequency respectively predetermined therefor, and/or said error report signaling that measured values ascertained by means of the processor are erroneous or unreliable by more than a predetermined degree, if the instantaneous clock frequencies of the first and second reference clock signals deviate from one another by more than a predetermined degree.

20. The method as claimed in claim 19, wherein: producing measured values representing said at least one measured variable includes using the at least one measurement signal as well as the working clock signal as a time-basis and/or a frequency base.

21. The measuring device electronics as claimed in claim 1, wherein: the processor is embodied as a microprocessor.

22. The measuring device electronics as claimed in claim 1, wherein: the processor is embodied as a digital signal processor.

23. The measuring device electronics as claimed in claim 1, wherein: said first clock signal generator is formed by means of a quartz oscillator.

24. The measuring device electronics as claimed in claim 1, wherein: said first clock signal generator is formed by means of a PLL circuit.

25. The measuring device electronics as claimed in claim 1, wherein: said first clock signal generator is formed by means of a FLL circuit.

26. The measuring device electronics as claimed in claim 1, wherein: said second clock signal generator is formed by means of a quartz oscillator.

27. The measuring device electronics as claimed in claim 1, wherein: said second clock signal generator is formed by means of a PLL circuit.

28. The measuring device electronics as claimed in claim 1, wherein: said second clock signal generator is formed by means of a FLL circuit.

29. The measuring device electronics as claimed in claim 7, further comprising: a non-volatile data memory adapted to store a datum containing a point in time of generation of said report.

30. The measuring device electronics as claimed in claim 8, further comprising: a non-volatile data memory adapted to store a point in time of ascertaining the frequency difference.

31. The measuring device electronics as claimed in claim 10, further comprising: a non-volatile data memory adapted to store a datum containing a point in time of generation of said report.

32. A measuring device for measuring at least one physical and/or chemical, measured variable of a medium conveyed in a line, or in a container, said measuring device comprising:
a measuring device electronics and a measuring transducer electrically coupled with said measuring device electronics for transducing the at least one measured variable into at least one measurement signal dependent thereon, wherein the measuring device electronics includes:
a processor,
a first clock signal generator for producing a working clock signal clocking the processor with a nominally constant frequency and for producing a first reference clock signal dependent on the working clock signal, said first reference clock signal exhibiting a nominally constant clocking frequency which is smaller than the clocking frequency of the working clock signal by a predetermined factor,
and a second clock signal generator for producing a second reference clock signal independent of the working clock signal, said second reference clock signal exhibiting a nominally constant clocking frequency which is smaller than the clocking frequency of the working clock signal by a predetermined factor.

33. The measuring device as claimed in claim 32, wherein: said processor of the measuring device electronics is adapted, making use of the working clock signal as reference, as well as making use of the at least one measurement signal, to ascertain a measured value representing the at least one measured variable.

34. The measuring device as claimed in claim 32, wherein: the measuring device is a measuring device which measures in a time-based and/or a frequency-based manner.

35. The measuring device as claimed in claim 32, wherein the measuring device is one of: a Coriolis mass flow measuring device, an ultrasonic flow measuring device, a vortex flow measuring device, an ultrasonic fill level measuring device, or a microwave fill level measuring device.

36. The method as claimed in claim 19, further comprising: storing the error report in a non-volatile data memory of the measuring device electronics.

37. The method as claimed in claim 19, further comprising:
   storing the ascertained frequency difference in a non-volatile data memory of the measuring device electronics.

38. The method as claimed in claim 37, further comprising:
   storing, in the non-volatile data memory, a datum containing a point in time of generation of the error report and/or a point in time of ascertaining the frequency difference.

39. A measuring device electronics for a measuring device, said measuring device electronics comprising:
   a processor;
   a first clock signal generator adapted to produce a working clock signal clocking the processor with a nominally constant clocking frequency and to produce a first reference clock signal dependent on the working clock signal, said first reference clock signal exhibiting a nominally constant clocking frequency, which is smaller than the clocking frequency of the working clock signal by a predetermined factor;
   a second clock signal generator adapted to produce a second reference clock signal independent of the working clock signal, said second reference clock signal exhibiting a nominally constant clocking frequency, which is smaller than the clocking frequency of the working clock signal by a predetermined factor;
   and a counter controlled by one of said two reference clock signals, said counter including a count input for the other reference clock signal, not controlling said counter;
   wherein:
   the clocking frequency of said reference clock signal controlling the counter determines a count interval, within which the counter counts clock signals of the reference clock signal present at the count input, and/or
   said reference clock signal present at the count input is that reference clock signal, whose clocking frequency is higher than the clocking frequency of the other reference clock signal, namely that controlling the counter.

40. The measuring device electronics as claimed in claim 39, wherein: the processor is adapted to ascertain an instantaneous frequency difference, defined as a difference between the instantaneous clocking frequency of said first reference clock signal and the instantaneous clocking frequency of said second reference clock signal.

41. The measuring device electronics as claimed in claim 40, further comprising: a non-volatile data memory adapted to store a point in time of ascertaining the frequency difference.

42. The measuring device electronics as claimed in claim 39, wherein: the processor is adapted to detect, based on said first reference clock signal as well as based on said second reference clock signal, whether at least one of said first and second clock signal generators is delivering a reference clock signal with an instantaneous clocking frequency, which deviates by a predetermined degree from the nominal clocking frequency respectively predetermined therefor.

43. A measuring device electronics for a measuring device, said measuring device electronics comprising:
   a processor;
   a first clock signal generator adapted to produce a working clock signal clocking the processor with a nominally constant clocking frequency and to produce a first reference clock signal dependent on the working clock signal, said first reference clock signal exhibiting a nominally constant clocking frequency, which is smaller than the clocking frequency of the working clock signal by a predetermined factor;
   a second clock signal generator adapted to produce a second reference clock signal independent of the working clock signal, said second reference clock signal exhibiting a nominally constant clocking frequency, which is smaller than the clocking frequency of the working clock signal by a predetermined factor;
   and a counter controlled by one of said two reference clock signals, said counter including a count input for the other reference clock signal, not controlling said counter;
   wherein: the processor is adapted to ascertain an instantaneous frequency difference, defined as a difference between the instantaneous clocking frequency of said first reference clock signal and the instantaneous clocking frequency of said second reference clock signal.

44. The measuring device electronics as claimed in claim 43, wherein: the processor is adapted to detect, based on said first reference clock signal as well as based on said second reference clock signal, whether at least one of said first and second clock signal generators is delivering a reference clock signal with an instantaneous clocking frequency, which deviates by a predetermined degree from the nominal clocking frequency respectively predetermined therefor.

45. The measuring device electronics as claimed in claim 43, further comprising: a non-volatile data memory adapted to storing the ascertained frequency difference.

* * * * *